United States Patent
Tanaka et al.

(10) Patent No.: US 9,594,708 B2
(45) Date of Patent: Mar. 14, 2017

(54) DATA PROCESSING DEVICE AND DATA TRANSFER CONTROL DEVICE

(71) Applicant: OLYMPUS CORPORATION, Tokyo (JP)

(72) Inventors: Yoshinobu Tanaka, Tokyo (JP); Hironobu Tomita, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 351 days.

(21) Appl. No.: 14/285,684

(22) Filed: May 23, 2014

(65) Prior Publication Data

US 2014/0365705 A1   Dec. 11, 2014

(30) Foreign Application Priority Data

Jun. 10, 2013 (JP) .................................. 2013-121935

(51) Int. Cl.
| | |
|---|---|
| G06F 13/36 | (2006.01) |
| G06F 12/00 | (2006.01) |
| G06F 13/362 | (2006.01) |
| G06T 1/60 | (2006.01) |

(52) U.S. Cl.
CPC ............ G06F 13/362 (2013.01); G06F 12/00 (2013.01); G06T 1/60 (2013.01)

(58) Field of Classification Search
CPC .................................. G06F 12/00; G06T 1/60
See application file for complete search history.

(56) References Cited

U.S. PATENT DOCUMENTS

2012/0239873 A1* 9/2012 Huang ................ G06F 13/1626
                                                         711/105
2013/0215131 A1* 8/2013 Sato .......................... G06T 1/60
                                                         345/557

FOREIGN PATENT DOCUMENTS

| JP | 2006-260472 A | 9/2006 |
|---|---|---|
| JP | 2008-5048 A | 1/2008 |
| JP | 2010-27006 A | 2/2010 |
| JP | 2011-3160 A | 1/2011 |

* cited by examiner

Primary Examiner — Henry Tsai
Assistant Examiner — Christopher A Daley
(74) Attorney, Agent, or Firm — Westerman, Hattori, Daniels & Adrian, LLP

(57) ABSTRACT

A data processing device includes: a processing block which is connected to a common bus and which processes a plurality of data, which is inputted simultaneously, in parallel; a memory which is consisted of address space which has a plurality of banks; and a common bus arbitration unit which arbitrates a request for access to the memory outputted from the processing block, and controls exchange of data via the common bus between the processing block whose access request has been accepted and the memory. The processing block includes a data transfer control device which changes an order of access to the bank of the memory corresponding to the respective data, unifies the respective data into an exchange data, and exchanges the exchange data with the memory when the processing block performs exchanging of the data to be processed in parallel with the memory via the common bus.

11 Claims, 12 Drawing Sheets

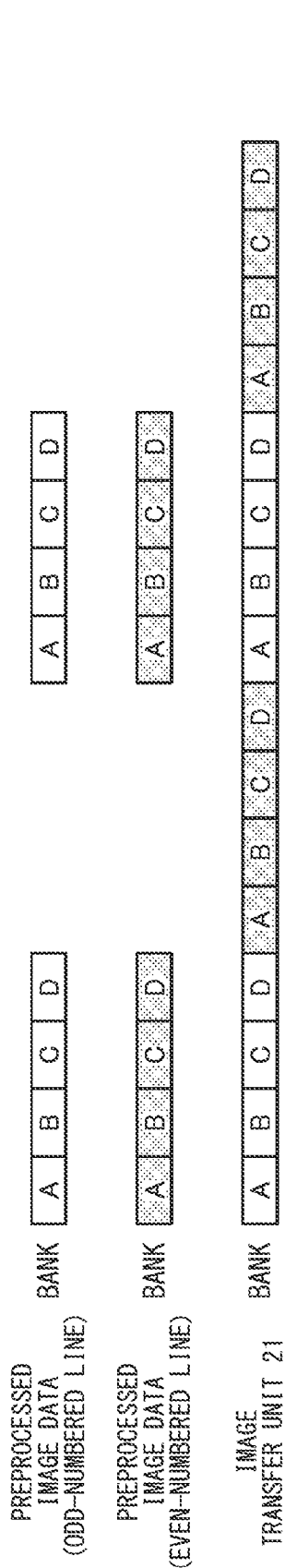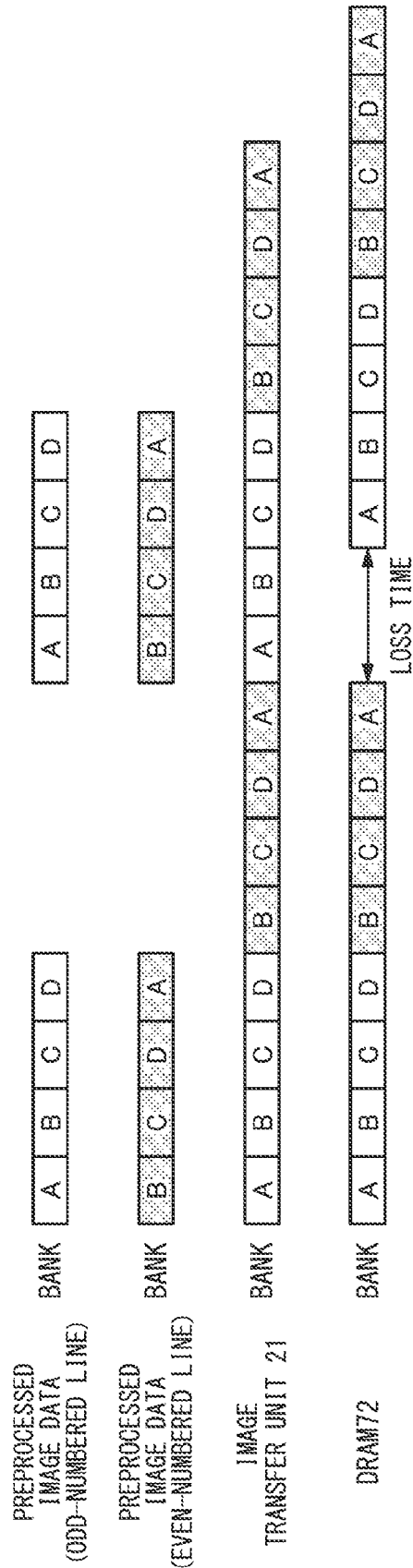

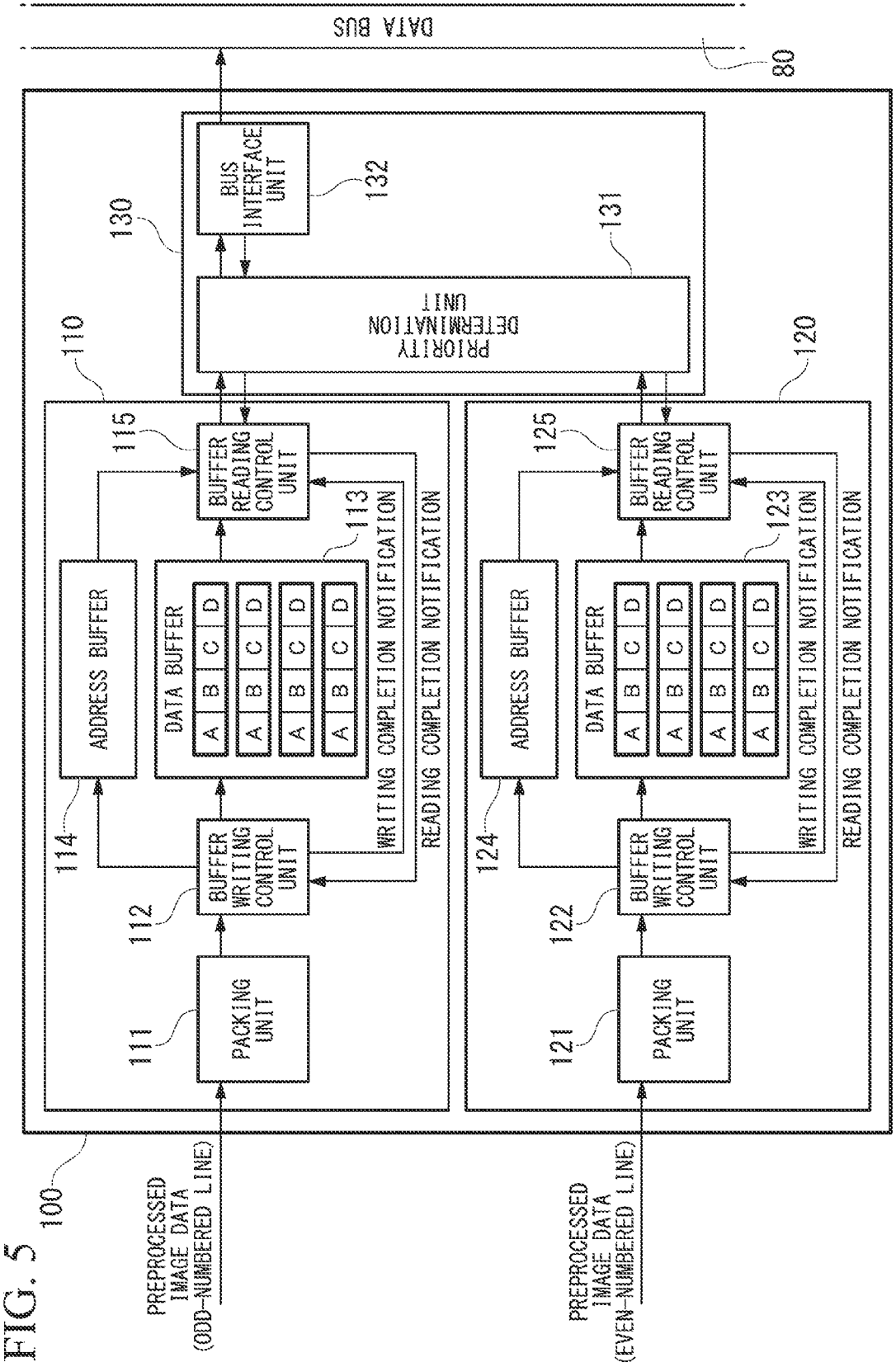

IMAGE CAPTURING BY IMAGE SENSOR 10

IMAGE PROCESSING BY IMAGE PROCESSING UNIT 30

| A | B | C | D | A | B | C | D | A | B | C | D |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

HORIZONTAL DIRECTION

| A | B | C | D | A | B | C | D |
|---|---|---|---|---|---|---|---|

VERTICAL DIRECTION

| A |
|---|
| A |
| A |
| A |
| A |
| A |
| A |
| A |

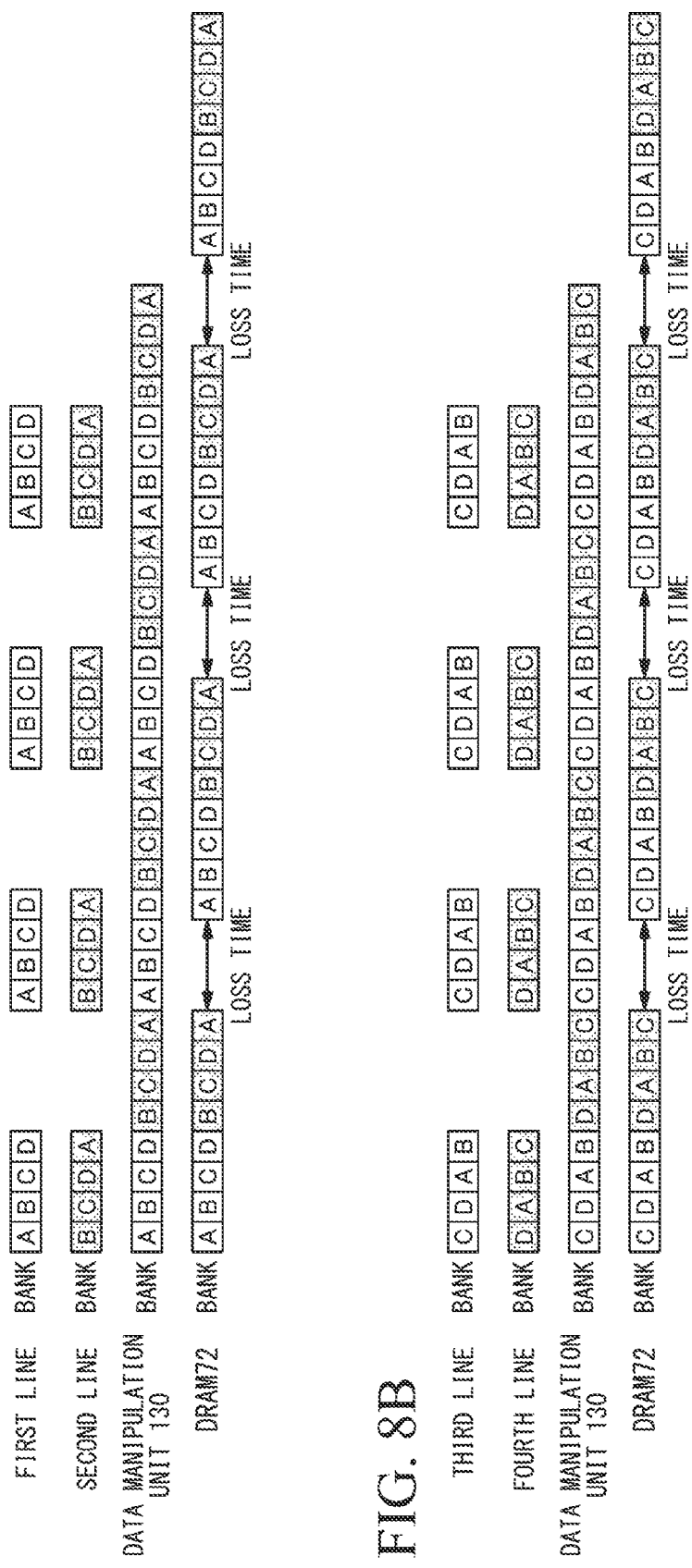

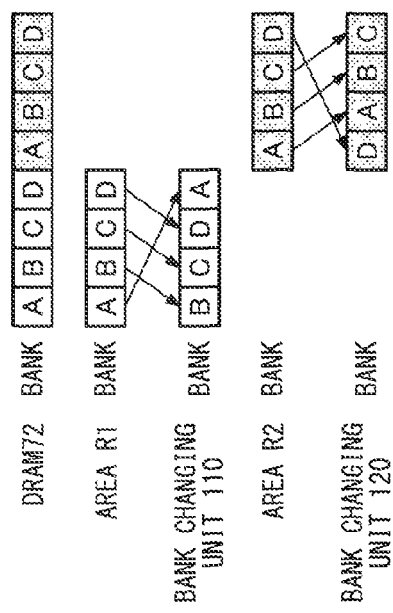
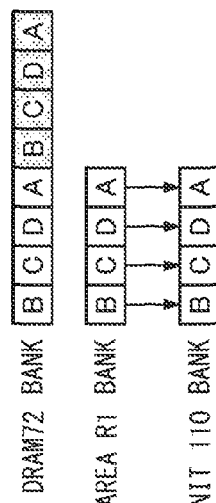

DATA PROCESSING DEVICE AND DATA TRANSFER CONTROL DEVICE

BACKGROUND OF THE INVENTION

Field of the Invention

The present invention relates to a data processing device and a data transfer control device.

Priority is claimed on Japanese Patent Application No. 2013-121935, filed Jun. 10, 2013, the contents of which are incorporated herein by reference.

Description of Related Art

In a large number of system LSIs, including a system LSI mounted on an image processing device such as a camera for still images, a camera for moving images, a medical endoscope camera or an industrial endoscope camera, a plurality of embedded processing blocks share one connected DRAM (Dynamic Random Access Memory). In such a system LSI, the plurality of embedded processing blocks are connected to a data bus in the system LSI, and each processing block performs access to the DRAM through DMA (Direct Memory Access). In this case, a bus arbiter controls the access to the DRAM while appropriately arbitrating requests for access (DMA requests) to the DRAM generated from the respective processing blocks.

A method called bank interleave is used to secure a bus band of the entire data bus at the time of access to a general DRAM. Here, the bus band indicates an amount of data on the data bus when each processing block accesses the DRAM. In the bank interleave, data transfer is controlled for each bank of the DRAM. When sequential access to different banks of the DRAM is performed through bank interleave, a process of setting an address of a bank to be accessed next during a process of data transfer from a first accessed bank can be performed in parallel. Therefore, it is possible to improve the efficiency of data access to the DRAM.

However, there is a period in which access cannot be accepted when the same bank is continuously accessed in the DRAM. Therefore, when the same bank of the DRAM is continuously accessed through bank interleave, loss time is generated due to the period in which the DRAM cannot accept the access, and the efficiency of data access to the DRAM is degraded. Therefore, it is necessary to sequentially access different banks through the bank interleave in order to secure high efficiency of data access by performing a data transfer process and an address setting process in parallel.

A method of preferentially accepting an access request from a processing block having high priority based on priorities of respective processing blocks in arbitration of access requests to DRAM in a general bus arbiter is known. Such a method may include, for example, a processing block in which processing breaks down when access to the DRAM is obstructed for a certain period of time. A method of securing a bus band of the entire data bus by selecting a processing block whose access request is accepted based on information of banks to be accessed is known. Such a method may include, for example, lowering priority of continuous access to the same bank.

However, when a system becomes complicated, the number of processing blocks embedded in the system LSI increases. Accordingly, a setting of priority for the respective processing blocks becomes complicated, and it is difficult to appropriately arbitrate requests for access to the DRAM from the processing blocks using only a bus arbiter.

A technology used to secure performance of a system by improving the bus band of the entire data bus through bank interleave, that is, improving the efficiency of data access to a DRAM while securing the bus band required by each processing block in order to solve such a problem, is conventionally disclosed.

A technology disclosed in Japanese Unexamined Patent Application, First Publication No. 2011-3160 is a technology used to perform control so that a processing block having high priority continuously accesses different banks of a DRAM by controlling the timing at which each processing block generates a request to access to the DRAM (request generation timing) or a method of generating addresses of the DRAM to be accessed by each processing block. According to this technology, it is possible to secure the bus band of the entire data bus while securing the priority of each processing block, that is, to efficiently perform data transfer.

A technology disclosed in Japanese Unexamined Patent Application, First Publication No. 2006-260472 or Japanese Unexamined Patent Application, First Publication No. 2010-27006 is a technology used to prevent continuous access to the same bank of a DRAM by changing, within a bus arbiter, the order that each bank accesses to the DRAM. According to this technology, generation of loss time in which the DRAM cannot accept the access can be minimized.

In recent years, with increasing of the speed of image processing devices, the speed of image sensors mounted on image processing devices have also been increasing. For example, an image sensor with a high speed by simultaneously outputting signals of a plurality of pixels is shown in Japanese Unexamined Patent Application, First Publication No. 2008-5048. Output forms of an imager which simultaneously outputs a plurality of pixel signals include, for example, a form of simultaneously outputting pixel signals of two pixels adjacent in a horizontal direction, and a form of simultaneously outputting pixel signals of two pixels adjacent in a vertical direction. In addition, in Japanese Unexamined Patent Application, First Publication No. 2008-5048, as an image sensor which is provided with two output channels which output signals of pixels, an image sensor, which outputs a signal of pixels of odd-numbered lines and even-numbered lines in a horizontal direction, and an image sensor, which outputs a signal of pixels of odd-numbered lines and even-numbered lines in a vertical direction, are disclosed.

SUMMARY OF THE INVENTION

According to a first aspect of the present invention, there is provided a data processing device including: a processing block which is connected to a common bus and which processes a plurality of data, which is inputted simultaneously, in parallel; a memory which is consisted of address space which has a plurality of banks; and a common bus arbitration unit which arbitrates a request for access to the memory outputted from the processing block, and controls exchange of data via the common bus between the processing block whose access request has been accepted and the memory. The processing block includes a data transfer control device which changes an order of access to the bank of the memory corresponding to the respective data, unifies the respective data into an exchange data, and exchanges the exchange data with the memory when the processing block performs exchanging of the data to be processed in parallel with the memory via the common bus.

According to a second aspect of the present invention, in the data processing device according to the first aspect of the present invention, the data transfer control device may include a bank changing unit which performs a change the respective data to be processed in parallel so that the order of access to the bank of the memory corresponding to the data becomes a predetermined order and a data manipulation unit which unifies the respective data into the exchange data so that the exchange the data to be processed in parallel with the memory is performed continuously in a predetermined order.

According to a third aspect of the present invention, in the data processing device according to the second aspect of the present invention, the bank changing unit may include a buffer unit which stores the respective data to be exchanged with the memory; a buffer writing control unit which stores the respective data in the buffer unit; and a buffer reading control unit which reads the respective data stored in the buffer unit.

According to a fourth aspect of the present invention, in the data processing device according to the third aspect of the present invention, the bank changing unit may include the buffer unit, the buffer writing control unit, and the buffer reading control unit for each of the data to be processed in parallel.

According to a fifth aspect of the present invention, in the data processing device according to the third aspect or the fourth aspect of the present invention, the buffer writing control unit may store the data in a storage area corresponding to the bank of the buffer unit based on a predetermined order of the data.

According to a sixth aspect of the present invention, in the data processing device according to the third aspect or the fourth aspect of the present invention, the buffer reading control unit may read the data from a storage area corresponding to the bank of the buffer unit based on a predetermined order of the data.

According to a seventh aspect of the present invention, in the data processing device according to any one of the first aspect to the sixth aspect of the present invention, the data processing device may further include at least one second processing block connected to the common bus. The data may be consisted of an area of a first direction and an area of a second direction, the data processing device may use the processing block as a first processing block, the first processing block may process a plurality of the data inputted simultaneously in the first direction of the data in parallel, may unify the respective processed data into the exchange data, may access the bank of the memory in the first direction of the data, and may exchange the exchange data with the memory, and the second processing block may access the bank of the memory in the second direction of the data, and may exchange at least one of the data which is included in the exchange data with the memory.

According to an eighth aspect of the present invention, in the data processing device according to the seventh aspect of the present invention, the data in the data processing device may be an image data, the first direction may be the horizontal direction of the image data, and the second direction may be the vertical direction of the image data.

According to a ninth aspect of the present invention, in the data processing device according to the eighth aspect of the present invention, data of two lines in the horizontal direction which are continuous in the vertical direction of the image data may be inputted simultaneously to the first processing block, and the first processing block may process the data of two lines which are inputted in parallel.

According to a tenth aspect of the present invention, in the data processing device according to the eighth aspect of the present invention, a plurality of the image data may be inputted simultaneously to the first processing block, and the first processing block may process the plurality of the image data which are inputted in parallel.

According to an eleventh aspect of the present invention, in the data processing device according to the tenth aspect of the present invention, data in the predetermined range in the horizontal direction and the vertical direction within the plurality of pieces of image data may be inputted simultaneously to the first processing block, and the first processing block may process each of the data in the predetermined range in parallel.

According to a twelfth aspect of the present invention there is provided a data transfer control device in a data processing device which includes: a processing block which is connected to a common bus and which processes a plurality of data, which is inputted simultaneously, in parallel; a memory which is consisted of address space which has a plurality of banks; and a common bus arbitration unit which arbitrates a request for access to the memory outputted from the processing block, and controls exchange of data via the common bus between the processing block whose access request has been accepted and the memory. The data transfer control device provides the processing block and changes an order of access to the bank of the memory corresponding to the respective data, unifies the respective data into an exchange data, and exchanges the exchange data with the memory when the processing block performs exchanging of the data to be processed in parallel with the memory via the common bus.

BRIEF DESCRIPTION OF THE DRAWINGS

FIGS. 2A and 2B are diagrams schematically illustrating an example of bank access of a DRAM in an image transfer unit which provides the image processing device to which the data transfer control device in the first embodiment is applied.

FIG. 5 is a block diagram illustrating a schematic configuration of the data transfer control device of the first embodiment.

FIGS. 8A and 8B are diagrams schematically illustrating an example of loss time caused by access to the banks of the DRAM in the data transfer control device of the first embodiment.

FIGS. 12A to 12C are diagrams illustrating another example of a data transfer method in the image processing device to which the data transfer control device of the first embodiment of the present invention is applied.

DETAILED DESCRIPTION OF THE INVENTION

<First Embodiment>

Figure 1:
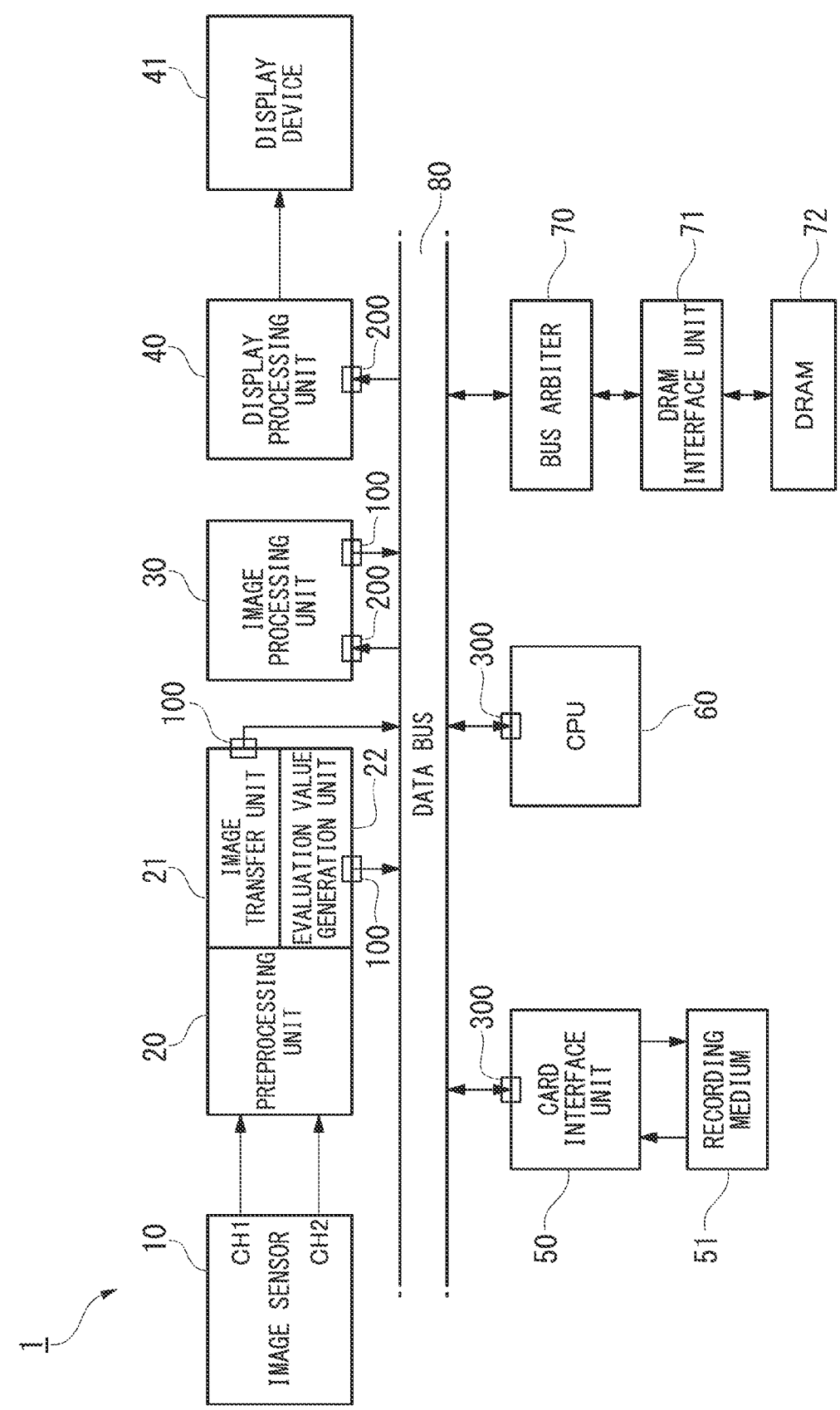
FIG. 1 is a block diagram illustrating a schematic configuration of an image processing device to which a data transfer control device in a first embodiment of the present invention is applied.

Hereinafter, a first embodiment of the present invention will be described with reference to the drawings. In the first embodiment, an example of a case in which an image processing device such as a camera for still images is a data processing device of the present invention, and a data transfer control device of the present invention is applied to this data processing device will be described. FIG. 1 is a block diagram illustrating a schematic configuration of the image processing device to which the data transfer control device in the first embodiment is applied. In FIG. 1, the image processing device 1 includes an image sensor 10, a preprocessing unit 20 including an image transfer unit 21 and an evaluation value generation unit 22, an image processing unit 30, a display processing unit 40, a display device 41, a card interface unit 50, a recording medium 51, a CPU 60, a bus arbiter 70, a DRAM interface unit 71, and a DRAM 72.

Each of the image transfer unit 21, the evaluation value generation unit 22, the image processing unit 30, the display processing unit 40, the card interface unit 50 and the CPU 60 in the image processing device 1 is connected to a data bus 80 which is a common bus by a data transfer control device 100, a data transfer control device 200 or a data transfer control device 300 of the first embodiment, as illustrated in FIG. 1. The data transfer control device 100, the data transfer control device 200 and the data transfer control device 300 of the first embodiment differ only in the direction of inputting and outputting data, and the basic method of inputting and outputting data is the same as that of the data transfer control device 100, the data transfer control device 200 and the data transfer control device 300.

Each processing block connected to the data bus 80 outputs an access request to a DRAM such as a DMA request to the bus arbiter 70 via the data bus 80. Each processing block performs reading of data from the DRAM 72 controlled by the DRAM interface unit 71 connected to the bus arbiter 70 and writing of data to the DRAM 72. Signals such as a DMA request signal, a DMA acceptance signal, a read/write control signal (RW control signal), an address, and data used for each processing block to perform DMA with the DRAM 72 are included in the data bus 80.

The image sensor 10 is an image sensor represented by a CCD (Charge Coupled Device) image sensor or a CMOS (Complementary Metal-Oxide Semiconductor) image sensor which photoelectrically converts an optical image of a subject imaged by a lens, which is not illustrated.

The image sensor 10 is an image sensor which includes two output channels which output signals of pixels and simultaneously outputs an image signal dependent on subject light (hereinafter referred to as "input image data") to the preprocessing unit 20 in two lines. For example, the image sensor 10 simultaneously outputs signals of two pixels adjacent in a vertical direction (column direction) as input image data of an odd-numbered line and an even-numbered line to the preprocessing unit 20. More specifically, for example, when the image sensor 10 is an image sensor of a Bayer array, the input image data corresponding to each pixel of the odd-numbered line in which an R pixel and a Gr pixel are arranged is outputted as input image data of the odd-numbered line from an output channel CH1 to the preprocessing unit 20. Simultaneously, the input image data corresponding to each pixel of the even-numbered line in which a Gb pixel and a B pixel are arranged is outputted as input image data of the even-numbered line from an output channel CH2 to the preprocessing unit 20.

The preprocessing unit 20 is a processing block which performs preprocessing such as scratch correction or shading correction to the input image data inputted from the image sensor 10. The preprocessing unit 20 performs preprocessing on each piece of the input image data inputted from the respective output channels of the image sensor 10, that is, the input image data of the odd-numbered lines and the input image data of the even-numbered lines in parallel.

The image transfer unit 21 which provides the preprocessing unit 20 transfers (writes) the image data of a preprocessing result (hereinafter referred to as "preprocessed image data") to the DRAM 72. In this case, the image transfer unit 21 collects (bundles) the preprocessed image data of the odd-numbered line and the preprocessed image data of the even-numbered line, and transfers (writes) the resultant data as one piece of preprocessed image data to the DRAM 72.

The evaluation value generation unit 22 which provides the preprocessing unit 20 generates an evaluation value used to perform control such as auto exposure (AE), auto focus (AF), and auto white balance (AWB) based on the preprocessed image data of the odd-numbered line and the preprocessed image data of the even-numbered line, and transfers (writes) the generated evaluation value to the DRAM 72.

When the image transfer unit 21 and the evaluation value generation unit 22 transfer the preprocessed image data and the evaluation value to the DRAM 72, the image transfer unit 21 and the evaluation value generation unit 22 outputs a DMA request signal for the DRAM 72 to the bus arbiter 70.

After the DMA request is accepted by the bus arbiter 70 and a DMA acceptance signal is inputted, the image transfer unit 21 and the evaluation value generation unit 22 outputs the preprocessed image data and the evaluation value to the DRAM 72 via the bus arbiter 70 and the DRAM interface unit 71.

The image processing unit 30 is a processing block which acquires (reads) the preprocessed image data stored in the DRAM 72, performs various image processing such as noise removal, an YC conversion process, a resizing process, or a JPEG compression process, and generates image data for displaying or image data for recording. The image processing unit 30 is also a processing block which transfers (writes) the generated image data for displaying and the generated image data for recording to the DRAM 72 again.

The image processing unit 30 outputs a DMA request signal for the DRAM 72 to the bus arbiter 70 when acquiring the preprocessed image data from the DRAM 72. After the DMA request is accepted by the bus arbiter 70 and a DMA acceptance signal is inputted, the image processing unit 30 reads the preprocessed image data from the DRAM 72 via the DRAM interface unit 71 and the bus arbiter 70.

When the image data for displaying and the image data for recording are transferred to the DRAM 72, the image processing unit 30 outputs a DMA request signal for the DRAM 72 to the bus arbiter 70.

After the DMA request is accepted by the bus arbiter 70 and the DMA acceptance signal is inputted, the image processing unit 30 outputs the generated image data for displaying and the generated image data for recording to the DRAM 72 via the bus arbiter 70 and the DRAM interface unit 71.

The display processing unit 40 acquires (reads) the image data for displaying stored in the DRAM 72. The display processing unit 40 is a processing block which performs a displaying process such as a process of superimposing data for OSD (On-Screen Display) displaying on the acquired image data for displaying, and outputs the resultant data to the display device 41.

The display processing unit 40 outputs a DMA request signal for the DRAM 72 to the bus arbiter 70 when acquiring the image data for displaying from the DRAM 72. After the DMA request is accepted by the bus arbiter 70 and a DMA acceptance signal is inputted, the display processing unit 40 reads the image data for displaying from the DRAM 72 via the DRAM interface unit 71 and the bus arbiter 70. The display processing unit 40 performs display processing on the read image data for displaying and then outputs the image data after display processing to the display device 41.

The display device 41 is a display device such as a TFT (Thin Film Transistor) liquid crystal display (LCD) or an organic EL (Electro Luminescence) display, and displays an image dependent on the image data after display processing which is outputted from the display processing unit 40.

The card interface unit 50 is a processing block which acquires (reads) the image data for recording stored in the DRAM 72 and records the image data on the recording medium 51. The card interface unit 50 is a processing block which reads the image data recorded on the recording medium 51 and transfers (writes) the read image data to the DRAM 72.

The card interface unit 50 outputs a DMA request signal for the DRAM 72 to the bus arbiter 70 when acquiring the image data for recording from the DRAM 72. After the DMA request is accepted by the bus arbiter 70 and a DMA acceptance signal is inputted, the card interface unit 50 reads the image data for recording from the DRAM 72 via the DRAM interface unit 71 and the bus arbiter 70. The card interface unit 50 outputs the read image data for recording to the recording medium 51 and records the image data on the recording medium 51.

The card interface unit 50 outputs a DMA request signal for the DRAM 72 to the bus arbiter 70 when transferring the read image data from the recording medium 51 to the DRAM 72. After the DMA request is accepted by the bus arbiter 70 and a DMA acceptance signal is inputted, the card interface unit 50 outputs the read image data from the recording medium 51 to the DRAM 72 via the bus arbiter 70 and the DRAM interface unit 71.

The recording medium 51 is a recording medium such as a memory card, and records the image data for recording outputted from the card interface unit 50. The recorded image data is read by the card interface unit 50. In FIG. 1, the recording medium 51 is a component of the image processing device 1, however, the recording medium 51 is detachable from the image processing device 1.

The CPU 60 is a processing block which controls the components of the image processing device 1, that is, the entire image processing device 1. Even when the CPU 60 controls the respective components of the image processing device 1, access to the DRAM 72 is performed. However, data which the CPU 60 acquires (reads) from the DRAM 72 or which transfers (writes) to the DRAM 72 includes not only the image data in the processing block described above, but also a parameter for setting an operation of each component of the image processing device 1.

When the CPU 60 acquires the data from the DRAM 72 by DMA, the CPU 60 outputs a DMA request signal for the DRAM 72 to the bus arbiter 70. After the DMA request is accepted by the bus arbiter 70 and a DMA acceptance signal is inputted, the CPU 60 reads the data to be acquired from the DRAM 72 via the DRAM interface unit 71 and the bus arbiter 70.

When the CPU 60 transfers the data to the DRAM 72 by DMA, the CPU 60 outputs a DMA request signal for the DRAM 72 to the bus arbiter 70. After the DMA request is accepted by the bus arbiter 70 and a DMA acceptance signal is inputted, the CPU 60 outputs the data to be transferred to the DRAM 72 via the bus arbiter 70 and the DRAM interface unit 71.

The bus arbiter (common bus arbitration unit) 70 arbitrates the transfer (writing) of data to the DRAM 72 and the acquisition (reading) of data from the DRAM 72 according to the DMA requests from the plurality of processing blocks in the image processing device 1 connected to the data bus 80.

More specifically, the bus arbiter 70 arbitrates the accesses to the DRAM 72 of the respective processing blocks based on bank interleave or priority of the respective processing blocks in response to the DMA request signals inputted from the respective processing blocks, and determines the processing block whose DMA request is to be accepted. The bus arbiter 70 outputs a DMA acceptance signal to the determined processing block.

Then, when the determined processing block transfers data to the DRAM 72, the bus arbiter 70 outputs a RW control signal indicating that the data is written to the DRAM 72, an address of the DRAM 72 inputted from the processing block, and data to be transferred, to the DRAM interface unit 71. When the determined processing block acquires data from the DRAM 72, the bus arbiter 70 outputs an RW control signal indicating that data is read from the DRAM 72 and an address of the DRAM 72 inputted from the processing block, to the DRAM interface unit 71. Then, the bus arbiter 70 outputs the data inputted from the DRAM interface unit 71, that is, the data acquired from the DRAM 72 to the determined processing block.

The DRAM interface unit 71 controls writing data to the DRAM 72 or reading data from the DRAM 72 based on the RW control signal indicating writing or reading of the DRAM 72 and the address of the DRAM 72 inputted from the bus arbiter 70. In other words, the DRAM interface unit 71 performs the writing of the data to the DRAM 72 or the reading of the data from the DRAM 72 according to DRAM access of the processing block determined by the bus arbiter 70.

More specifically, when the RW control signal inputted from the bus arbiter 70 indicates the writing to the DRAM 72, the DRAM interface unit 71 outputs the data inputted from the bus arbiter 70 to the DRAM 72. When the RW control signal inputted from the bus arbiter 70 indicates the reading of the DRAM 72, the DRAM interface unit 71 outputs the data outputted from the DRAM 72 to the bus arbiter 70.

The DRAM 72 is a memory to which the access is controlled by the DRAM interface unit 71 and stores various data in a processing procedure of each processing block in the image processing device 1.

Thus, each processing block in the image processing device 1 outputs a DMA request to the bus arbiter 70 when the processing block accesses the DRAM 72. After the DMA request is accepted by the bus arbiter 70, each processing block in the image processing device 1 performs data writing to the DRAM 72 or data reading from the DRAM 72 via the data bus 80, the bus arbiter 70 and the DRAM interface unit 71.

Here, an example of an operation of the image processing device 1 will be described with reference to FIG. 2 in order to describe a method of accessing to the DRAM 72 in each processing block within the image processing device 1. In the image processing device 1, the image sensor 10 simultaneously outputs the input image data of the odd-numbered line and the input image data of the even-numbered line to the preprocessing unit 20, as described above. The preprocessing unit 20 preprocesses the input image data of the odd-numbered line and the input image data of the even-numbered line, which have been input, in parallel. Therefore, the image transfer unit 21 bundles the preprocessed image data of the odd-numbered line and the preprocessed image data of the even-numbered line and transfers (writes) the resultant image data to the DRAM 72 as one piece of preprocessed image data, as described above.

FIGS. 2A and 2B are diagrams schematically illustrating an example of access to the banks of the DRAM 72 in the image transfer unit 21 which provides the image processing device 1 to which the data transfer control device 100 in the first embodiment is applied. A timing when access to the banks of the DRAM 72 when the image transfer unit 21 transfers (writes) the preprocessed image data of the odd-numbered lines and the preprocessed image data of the even-numbered lines is in the same order in the odd-numbered line and the even-numbered line is illustrated in FIG. 2A. A timing when the access to the banks of the DRAM 72 when the image transfer unit 21 transfers (writes) the preprocessed image data of the odd-numbered lines and the preprocessed image data of the even-numbered lines is in different orders in the odd-numbered line and the even-numbered line is illustrated in FIG. 2B.

When the odd-numbered line and the even-numbered line during transferring (writing) by the image transfer unit 21 access the banks of the DRAM 72 in the same order as illustrated in FIG. 2A, continuous access to the same bank of the DRAM 72 does not occur. More specifically, when the image transfer unit 21 accesses the respective banks in the order of bank A, bank B, bank C and bank D and transfers (writes) the preprocessed image data of the even-numbered lines, after the image transfer unit 21 accesses the respective banks of the DRAM 72 in the order of bank A, bank B, bank C and bank D and transfers (writes) the preprocessed image data of the odd-numbered lines, the continuous access to the same bank of the DRAM 72 does not occur. Therefore, efficiency of access to the DRAM 72 is not degraded.

However, when the odd-numbered line and the even-numbered line during transfer (writing) by the image transfer unit 21 access the banks of the DRAM 72 in different orders as illustrated in FIG. 2B, continuous access to the same bank of the DRAM 72 occurs.

More specifically, when the image transfer unit 21 accesses the banks in the order of bank B, bank C, bank D and bank A and transfers (writes) the preprocessed image data of the even-numbered line, after the image transfer unit 21 accesses the respective banks of the DRAM 72 in the order of bank A, bank B, bank C and bank D and transfers (writes) the preprocessed image data of the odd-numbered line, access to bank A of the even-numbered line and access to bank A of the next odd-numbered line are continuous. In this case, since the DRAM 72 cannot accept continuous access to bank A, a corresponding period is a loss time, and efficiency of access to the DRAM 72 is degraded.

Figure 3:
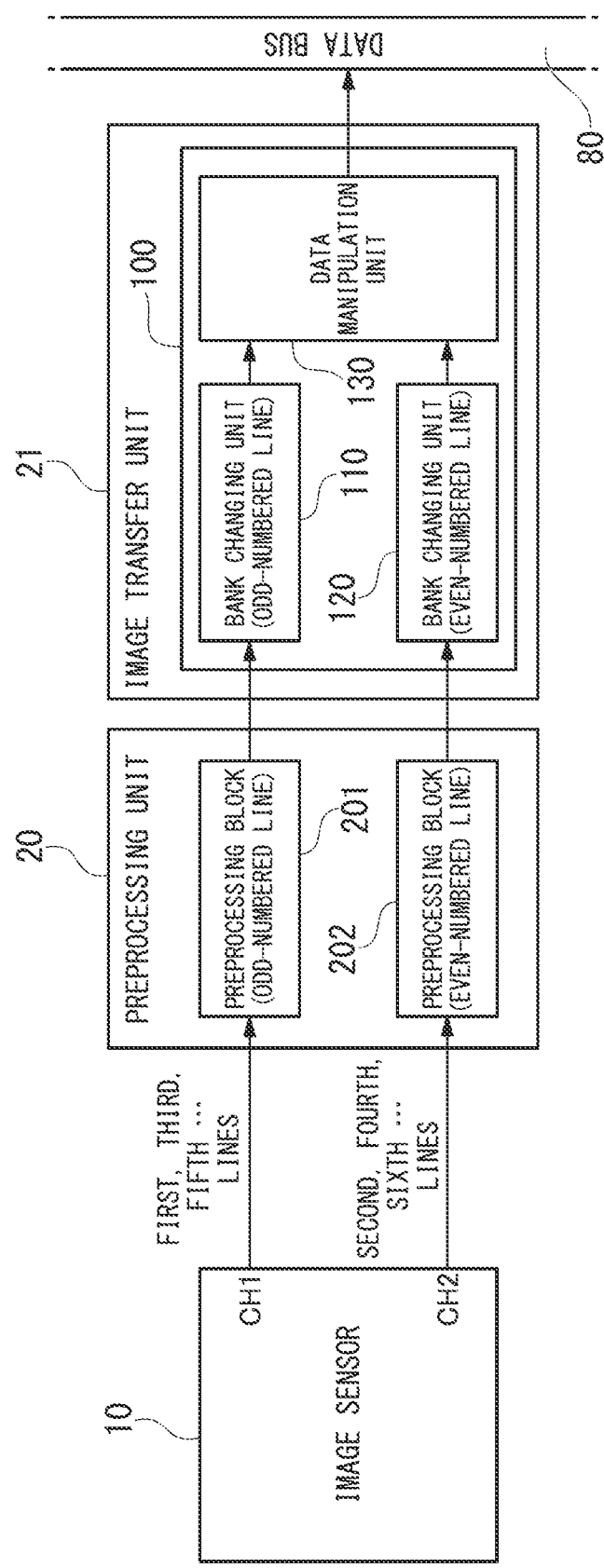
FIG. 3 is a diagram illustrating a function of the data transfer control device of the first embodiment.

Therefore, the data transfer control device which provides each processing block prevents the continuous access to the same bank of the DRAM 72 by changing the orders of the banks when the corresponding processing block accesses the DRAM 72. FIG. 3 is a diagram illustrating a function of the data transfer control device 100 of the first embodiment. Components of the preprocessing unit 20 and the data transfer control device 100 in the image transfer unit 21 relating to the preprocessing of the input image data outputted by the image sensor 10 and to the transferring (writing) to the DRAM 72 are illustrated in FIG. 3.

The preprocessing unit 20 includes a preprocessing block 201 and a preprocessing block 202 which perform preprocessing to the input image data simultaneously inputted from the image sensor 10, as illustrated in FIG. 3. The preprocessing block 201 and the preprocessing block 202 have the same configuration. In FIG. 3, the preprocessing block 201 performs preprocessing to the input image data of the odd-numbered lines outputted from an output channel CH1 of the image sensor 10. The preprocessing block 202 performs preprocessing on the input image data of the even-numbered lines outputted from an output channel CH2 of the image sensor 10. With this configuration, the preprocessing unit 20 performs preprocessing on the input image data of the odd-numbered lines and the input image data of the even-numbered lines, which are simultaneously inputted from the image sensor 10, in parallel.

The data transfer control device 100 which provides the image transfer unit 21 includes a bank changing unit 110, a bank changing unit 120, and a data manipulation unit 130, as illustrated in FIG. 3. The bank changing unit 110 and the bank changing unit 120 have the same configuration. In FIG. 3, the bank changing unit 110 changes an order of access to the banks when the preprocessed image data of the odd-numbered lines outputted from the preprocessing block 201 is transferred (written) to the DRAM 72. On the other hand, the bank changing unit 120 changes an order of access to the banks when the preprocessed image data of the even-numbered lines outputted from the preprocessing block 202 is transferred (written) to the DRAM 72. With this configuration, the data transfer control device 100 which provides the image transfer unit 21 prevents the continuous access to the banks of the DRAM 72 and suppresses the degradation of the efficiency of access to the DRAM 72 due to the loss time as illustrated in FIG. 2B.

The data manipulation unit 130 bundles the preprocessed image data of the odd-numbered lines whose order of access to the banks of the DRAM 72 has been changed by the bank changing unit 110 and the preprocessed image data of the even-numbered lines whose order of access to the banks of the DRAM 72 has been changed by the bank changing unit 120, and transfers (writes) the resultant image data to the DRAM 72. Thus, by bundling the preprocessed image data of the odd-numbered lines and the preprocessed image data of the even-numbered lines, it is possible to reduce the number of the data transfer control devices which output the DMA request to the bus arbiter 70 in comparison with the configuration in which the preprocessed image data of the odd-numbered lines and the preprocessed image data of the even-numbered lines are separately transferred (written) to the DRAM 72. In other words, in the configuration in which preprocessed image data is separately transferred (written), it is necessary to include two data transfer control devices, that is, the data transfer control device corresponding to the preprocessed image data of the odd-numbered lines and the data transfer control device corresponding to the preprocessed image data of the even-numbered lines. On the other hand, in the configuration in which the preprocessed image data is bundled and transferred (written), two pieces of preprocessed image data can be transferred (written) by only one data transfer control device.

Figure 4:
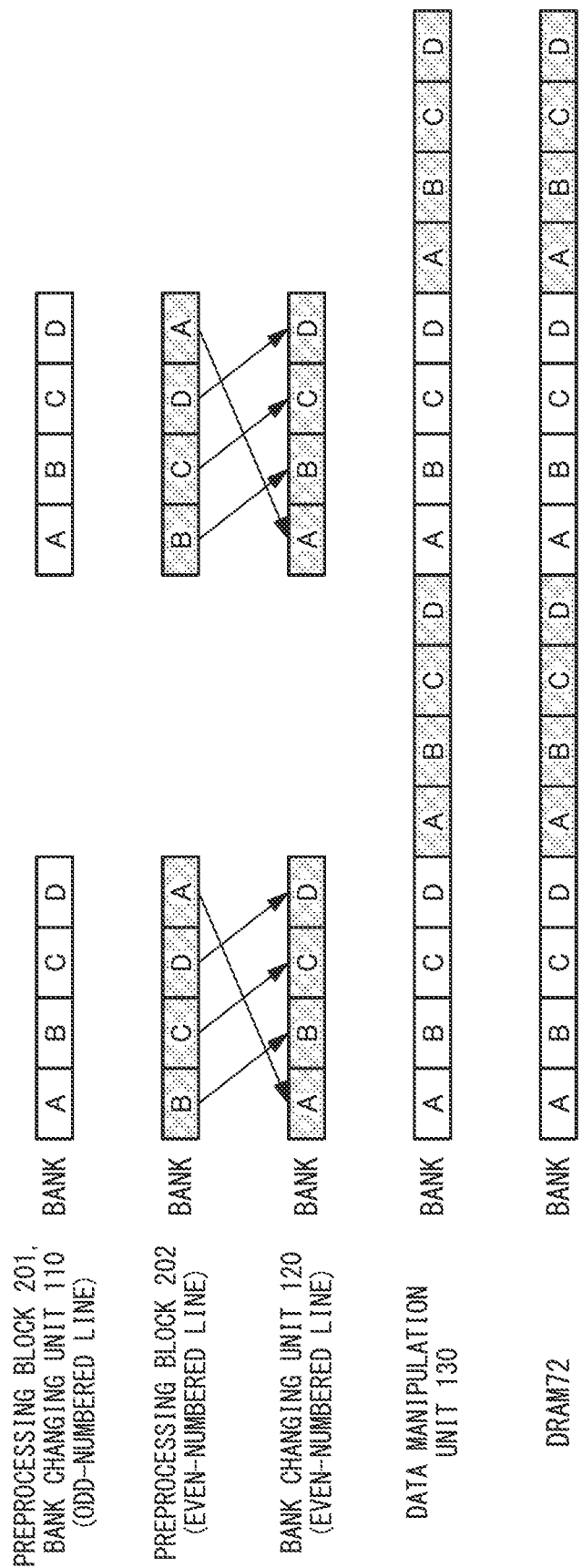
FIG. 4 is a diagram schematically illustrating an example of prevention of loss time caused by access to the banks of the DRAM through a process of changing the banks in the data transfer control device of the first embodiment.

Here, an example of an operation of changing the order of access to the banks of the DRAM 72 through a process of changing the banks in the data transfer control device 100 which provides the image transfer unit 21 will be described. FIG. 4 is a diagram schematically illustrating an example of prevention of loss time caused by access to the banks of the DRAM 72 through a process of changing the banks in the data transfer control device 100 of the first embodiment. A timing when the preprocessed image data of the odd-numbered lines accessing the banks in the order of bank A, bank B, bank C and bank D, inputted from the preprocessing block 201, is transferred (written) and then the preprocessed image data of the even-numbered lines accessing the banks in the order of bank B, bank C, bank D and bank A, inputted from the preprocessing block 202, is transferred (written) is illustrated in FIG. 4.

A case in which the data transfer control device 100 which provides the image transfer unit 21 transfers (writes) the preprocessed image data of the odd-numbered line in the order of bank A, bank B, bank C and bank D and then transfers (writes) the preprocessed image data of the even-numbered line in the order of bank B, bank C, bank D and bank A is considered. In this case, continuous access to the same bank of the DRAM 72 occurs when bank A of the next odd-numbered line is accessed subsequent to bank A of the even-numbered line, as in the access to the banks of the DRAM 72 illustrated in FIG. 2B.

On the other hand, in the access to the banks of the DRAM 72 illustrated in FIG. 4, the bank changing unit 120 in the data transfer control device 100 which provides the image transfer unit 21 changes the order of transferring (writing) the preprocessed image data of the even-numbered lines. In other words, the bank changing unit 120 changes the order so that the order of access to the banks of the DRAM 72 when the bank changing unit 120 transfers (writes) the preprocessed image data of the even-numbered line and the order of access to the bank of the DRAM 72 when the bank changing unit 110 transfers (writes) the preprocessed image data of the odd-numbered line become the same order. Accordingly, the image transfer unit 21 can prevent the continuous access to the same bank of the DRAM 72 through bank interleave.

More specifically, the bank changing unit 110 does not change the order of access to the banks of the DRAM 72 when the preprocessed image data of the odd-numbered line outputted from the preprocessing block 201 is transferred (written), as the access to the banks of the DRAM 72 illustrated in FIG. 2B. In other words, the banks are accessed in the order of bank A, bank B, bank C and bank D and the preprocessed image data of the odd-numbered line is transferred (written). Then, a case in which, when the preprocessed image data of the even-numbered line outputted from the preprocessing block 202 is transferred (written), the bank changing unit 120 does not change the order of access to the banks of the DRAM 72, the banks are accessed in the order of bank B, bank C, bank D and bank A, and the preprocessed image data of the even-numbered lines is transferred (written), is considered. In this case, access to bank A of the even-numbered line and access to bank A of the next odd-numbered line are continuous, as the access to the banks of the DRAM 72 illustrated in FIG. 2B. Therefore, the bank changing unit 120 changes the order of accessing the respective banks of the DRAM 72 when the preprocessed image data of the even-numbered line is transferred (written) into the order of bank A, bank B, bank C and bank D as the bank changing unit 110, as illustrated in FIG. 4. Accordingly, since the preprocessed image data of the odd-numbered line and the preprocessed image data of the even-numbered line are alternately transferred (written), the continuous access to the same bank of the DRAM 72 can be prevented even when the access to respective banks of the DRAM 72 is continuously performed.

Thus, the bank changing unit 120 in the data transfer control device 100 which provides the image transfer unit 21 changes the order of the banks during accessing to the DRAM 72 into the same order as the order of the banks during accessing to the DRAM 72 by the bank changing unit 110. Accordingly, the order of the banks when the data transfer control device 100 which provides the image transfer unit 21 accesses the DRAM 72 is the same in all bank changing units in the data transfer control device 100. Accordingly, in the image transfer unit 21, the continuous access to the same bank of the DRAM 72 through bank interleave does not occur even when the respective preprocessed image data which is obtained by preprocessing to the input image data of the odd-numbered line and to the input image data of the even-numbered line, which are simultaneously inputted from the image sensor 10, is inputted from the preprocessing unit 20. Accordingly, it is possible to suppress degradation of the efficiency of the access to the DRAM 72 due to the loss time.

Next, a configuration of the data transfer control device 100 which provides the image transfer unit 21 will be described in more detail. FIG. 5 is a block diagram illustrating a schematic configuration of the data transfer control device 100 of the first embodiment. The data transfer control device 100 is provided with a bank changing unit 110, a bank changing unit 120, and a data manipulation unit 130, as illustrated in FIG. 5. The bank changing unit 110 is provided with a packing unit 111, a buffer writing control unit 112, a data buffer 113, an address buffer 114 and a buffer reading control unit 115. The bank changing unit 120 is provided with a packing unit 121, a buffer writing control unit 122, a data buffer 123, an address buffer 124, and a buffer reading control unit 125. The data manipulation unit 130 is provided with a priority determination unit 131, and a bus interface unit 132.

The data transfer control device 100 bundles the preprocessed image data of the odd-numbered line and the preprocessed image data of the even-numbered line into one piece of preprocessed image data, and transfers (writes) the resultant image data as one piece of preprocessed image data to the DRAM 72 via the data bus 80. The data transfer control device 100 outputs a DMA request signal for such transfer to the bus arbiter 70 via the data bus 80. In this case, the data transfer control device 100 collects preprocessed image data of a plurality of odd-numbered lines and preprocessed image data of a plurality of even-numbered lines to be transferred to the DRAM 72 so that an order of banks for access to the DRAM 72 is continuous which is predetermined. The data transfer control device 100 then outputs a DMA request signal to the bus arbiter 70 after bundling the preprocessed image data of the odd-numbered lines and the preprocessed image data of the even-numbered line which have been collected. After the DMA request is accepted by the bus arbiter 70 and a DMA acceptance signal is inputted, the data transfer control device 100 outputs the one piece of bundled preprocessed image data to the bus arbiter 70 via the data bus 80 to be continuous in a predetermined bank order. Accordingly, in the image processing device 1, the bus arbiter 70 and the DRAM interface unit 71 operate according to the DMA from the data transfer control device 100. Further, in the image processing device 1, the one piece of preprocessed image data outputted from the data transfer control device 100 is written to a storage area corresponding to an address of the DRAM 72 designated in the data transfer control device 100.

A case in which address space of the DRAM 72 which is a transfer destination of the preprocessed image data from the data transfer control device 100 includes four banks (bank A, bank B, bank C and bank D) will be described in the following description. A case which an access through bank interleave which continuously performs accessing twice to the four banks of the DRAM 72 is one transfer unit of DMA, in one DMA by the data transfer control device 100, will be described in the following description.

Each of the bank changing unit 110 and the bank changing unit 120 changes an order of access to the banks during the transferring (writing) of the preprocessed image data of the corresponding odd or even-numbered line to the DRAM 72. The bank changing unit 110 and the bank changing unit 120 have the same configuration. In the following description, the bank changing unit 110 corresponding to the preprocessed image data of the odd-numbered line will be described by way of example.

The packing unit 111 collects (packs) the sequentially inputted preprocessed image data of the odd-numbered line in units, which is suitable for a bus width of the data bus 80, and outputs the resultant image data to the buffer writing control unit 112. For example, when the preprocessed image data of the odd-numbered line consists of 8 bits and the bus width of the data bus 80 is 32 bits, the packing unit 111 packs the four pieces of sequentially input preprocessed image data of odd-numbered line to be preprocessed image data of the odd-numbered line of 32 bits. The packing unit 111 outputs the packed preprocessed image data of the odd-numbered line of 32 bits to the buffer writing control unit 112. In this case, a method of packing the four pieces of sequentially input preprocessed image data of odd-numbered line, for example, from lower bits to be the preprocessed image data of the odd-numbered line of 32 bits is considered as a method by which the packing unit 111 packs the preprocessed image data of the odd-numbered line. Further, another method may include a method of packing the preprocessed image data from upper bits to be the preprocessed image data of the odd-numbered line of 32 bits. Still another method may include a method by which the CPU 60 sets an order of packing the preprocessed image data of the odd-numbered line to a packing order register, which is not illustrated, and packs the four pieces of sequentially input preprocessed image data of odd-numbered line based on the set order to be the preprocessed image data of the odd-numbered line of 32 bits.

The packing unit 111 generates addresses of the DRAM 72 to which the packed preprocessed image data of the odd-numbered line is to be transferred, and outputs the generated addresses to the buffer writing control unit 112. In this case, a method of generating addresses of a storage area of the DRAM 72 to designate banks to which the packed preprocessed image data of the odd-numbered line of 32 bits is to be transferred, in a predetermined ascending order, may be considered as a method by which the packing unit 111 generates the addresses. Further, another method may include, for example, a method of generating addresses of the storage area of the DRAM 72 designated in the predetermined descending order. For example, a method by which the CPU 60 sets an order of banks to which the preprocessed image data of the odd-numbered lines is to be transferred in a packing order register, which is not illustrated, and generates the addresses of the storage area of the DRAM 72 to designate banks to which the packed preprocessed image data of the odd-numbered line of 32 bits is to be transferred based on the set order of the banks may be considered.

The buffer writing control unit 112 sequentially stores the packed preprocessed image data of the odd-numbered line inputted from the packing unit 111 to the data buffer 113. The buffer writing control unit 112 sequentially stores the addresses inputted from the packing unit 111 to the address buffer 114. The buffer writing control unit 112 outputs a writing completion notification to the buffer reading control unit 115 when storing an preprocessed image data of the odd-numbered line and address which corresponds to an amount of transferring to DRAM 72 by one DMA to the data buffer 113 and the address buffer 114 is completed. The writing completion notification indicates that the storing of the preprocessed image data of the odd-numbered line and the address in the data buffer 113 and the address buffer 114 is completed, that is, indicates that one DMA is ready. In the following description, the preprocessed image data of the odd-numbered line and the address to be transferred in one DMA are collectively referred to as "odd-numbered line data of one transfer unit".

When a reading completion notification indicating that reading of the odd-numbered line data of one transfer unit stored in each of the data buffer 113 and the address buffer 114 is completed is inputted from the buffer reading control unit 115, the buffer writing control unit 112 determines that there is available space in the storage area of the data buffer 113 and the address buffer 114, and starts storing of the next odd-numbered line data of one transfer unit.

The data buffer (buffer unit) 113 is a storage unit which temporally stores a plurality of the packed preprocessed image data of odd-numbered lines sequentially inputted from the buffer writing control unit 112 according to control of the buffer writing control unit 112. The data buffer 113 is consisted of, for example, an SRAM (Static Random Access Memory). The number of the storage areas for storing the preprocessed image data of the plurality of odd-numbered lines to be transferred to the corresponding banks of the DRAM 72 which is held by the data buffer 113 is the number of banks which provides the DRAM 72. For example, when the packed preprocessed image data of the odd-numbered line of 32 bits is inputted from the buffer writing control unit 112, the data buffer 113 includes four storage areas having a storage capacity for storing 16 pieces of preprocessed image data, that is, four storage areas of 64 bytes according to the number of banks which provides the DRAM 72. The data buffer 113 sequentially outputs the preprocessed image data of the odd-numbered line stored in the respective storage areas to the buffer reading control unit 115 according to control of the buffer reading control unit 115.

The data transfer control device 100 illustrated in FIG. 5 is provided with four storage area groups in which four storage areas are constituted with one set. In the data transfer control device 100, all preprocessed image data of the odd-numbered lines stored in the storage area group is preprocessed image data of odd-numbered lines which provides the odd-numbered line data of one transfer unit. With this configuration, the data transfer control device 100 can perform burst transfer four times. In this burst transfer, 16 pieces of preprocessed image data of odd-numbered lines of 32 bits is continuously transferred to the four banks of the DRAM 72. Here, reference signs described within the respective storage areas indicate the banks of the DRAM 72 to which the respective storage areas correspond.

In the data transfer control device 100 of the first embodiment, a timing at which the preprocessed image data of the odd-numbered line is written to the data buffer 113 and a timing at which the preprocessed image data of the odd-numbered line is read from the data buffer 113 are not particularly limited. Therefore, the data buffer 113 may be an SRAM in which the data writing timing and the data reading timing can be controlled at different timings. In other words, a write clock which is the timing at which the preprocessed image data of the odd-numbered line is written to the data buffer 113 and a read clock which is the timing at which the preprocessed image data of the odd-numbered line is read from the data buffer 113 may be different clocks by making an operation clock of the buffer writing control unit 112 and an operation clock of the buffer reading control unit 115 different.

The address buffer (buffer unit) 114 is a storage unit which temporally stores addresses of the DRAM 72 inputted from the buffer writing control unit 112 according to control of the buffer writing control unit 112. The address buffer 114 has the same configuration as the data buffer 113. In other words, the address buffer 114 is a storage unit which stores an address for designating a bank of the DRAM 72 which is a destination to which the preprocessed image data of the odd-numbered line stored in the data buffer 113 is transferred (written). The address buffer 114 includes storage areas corresponding to the respective storage areas in the data buffer 113 by the same number as those of the data buffers 113. However, a storage capacity of the storage areas of the address buffer 114 is not limited to the same storage capacity as that of the storage area in the data buffer 113, but is a storage capacity necessary to store addresses designated when the preprocessed image data of the odd-numbered lines stored in the storage area of the data buffer 113 is transferred to the DRAM 72. The address buffer 114 sequentially outputs the addresses stored in the respective storage areas to the buffer reading control unit 115 according to control of the buffer reading control unit 115.

The configuration of the data transfer control device 100 illustrated in FIG. 5 is provided with four storage area groups in which four storage areas are constituted as one set, as in the data buffer 113. In the data transfer control device 100, addresses of the preprocessed image data of all odd-numbered lines stored in the storage area group are addresses which provide the odd-numbered line data of one transfer unit. With this configuration, the data transfer control device 100 can perform burst transfer four times. In this burst transfer, 16 pieces of the packed preprocessed image data of the odd-numbered lines is transferred to the respective banks of the DRAM 72, continuously to the four banks. In the configuration of the data transfer control device 100 illustrated in FIG. 5, reference signs indicating the respective storage area in the address buffer 114 and the banks of the DRAM 72 to which the respective storage areas correspond are omitted.

In the data transfer control device 100 of the first embodiment, a timing at which the preprocessed image data of the odd-numbered line is written to the address buffer 114 and a timing at which the preprocessed image data of the odd-numbered line is read from the address buffer 114 are not also particularly limited. The data buffer 113 and the address buffer 114 may not necessarily be consisted of individual buffers and may have a configuration in which a data buffer area and an address buffer area are provided in different storage areas of the same SRAM.

When a writing completion notification is inputted from the buffer writing control unit 112, the buffer reading control unit 115 determines that the storing of the odd-numbered line data of one transfer unit in the storage areas of the data buffer 113 and the address buffer 114 is completed. The buffer reading control unit 115 sequentially reads the packed preprocessed image data of the odd-numbered line stored in the data buffer 113 and the addresses stored in the address buffer 114 in cooperation with the priority determination unit 131 in the data manipulation unit 130. The buffer reading control unit 115 outputs the read preprocessed image data of the odd-numbered lines and the read addresses to the priority determination unit 131 in the data manipulation unit 130.

When reading of an amount of the preprocessed image data of the odd-numbered lines and the addresses to be transferred to the DRAM 72 by one DMA from the data buffer 113 and the address buffer 114 is completed, the buffer reading control unit 115 outputs a reading completion notification to the buffer writing control unit 112. The reading completion notification indicates that the reading of the preprocessed image data of the odd-numbered lines and the addresses from the data buffer 113 and the address buffer 114 is completed, that is to say, reading of the odd-numbered line data of one transfer unit is completed. Thus, the buffer reading control unit 115 notifies the buffer writing control unit 112 that there is available space in the storage areas of the data buffer 113 and the address buffer 114.

The data transfer control device 100 is provided with the bank changing unit 120 having the same configuration as the above-described bank changing unit 110 in order to transfer (write) the preprocessed image data of the even-numbered lines to the DRAM 72. In other words, a packing unit 121, a buffer writing control unit 122, a data buffer 123, an address buffer 124 and a buffer reading control unit 125 which provides the bank changing unit 120 have the same configuration and perform the same operation as the packing unit 111, the buffer writing control unit 112, the data buffer 113, the address buffer 114 and the buffer reading control unit 115 which provides the bank changing unit 110, respectively. Therefore, a detailed description of the packing unit 121, the buffer writing control unit 122, the data buffer 123, the address buffer 124, and the buffer reading control unit 125 which provides the bank changing unit 120 is omitted here.

The respective components of the bank changing unit 110 correspond to the preprocessed image data of the odd-numbered lines, whereas the bank changing unit 120 corresponds to the preprocessed image data of the even-numbered lines. In the following description, the preprocessed image data of the even-numbered lines and the addresses to be transferred in one DMA are collectively referred to as "even-numbered line data of one transfer unit".

The data manipulation unit 130 bundles the preprocessed image data of odd-numbered lines whose order of access to the banks of the DRAM 72 has been changed by the bank changing unit 110 and the preprocessed image data of even-numbered lines whose order of access to the banks of the DRAM 72 has been changed by the bank changing unit 120, and transfers (writes) the resultant image data to the DRAM 72. In other words, the data manipulation unit 130 bundles the odd-numbered line data of one transfer unit outputted from the bank changing unit 110 and the even-numbered line data of one transfer unit outputted from the bank changing unit 120, and transfers (writes) the resultant image data to the DRAM 72.

The priority determination unit 131 bundles the preprocessed image data of the odd-numbered line and the addresses, which are inputted from the buffer reading control unit 115, and the preprocessed image data of the even-numbered line and the addresses, which are inputted from the buffer reading control unit 125, into one preprocessed image data and address based on a predetermined priority at the time of transferring (writing) the preprocessed image data. More specifically, the priority determination unit 131 bundles the preprocessed image data of the odd-numbered line and the addresses and the preprocessed image data of the even-numbered line and the addresses into one preprocessed image data and address in order to transfer (write) the preprocessed image data of the even-numbered line subsequent to the preprocessed image data of the odd-numbered line. The priority determination unit 131 outputs the bundled preprocessed image data and address to the bus interface unit 132. In other words, the priority determination unit 131 bundles the odd-numbered line data of one transfer unit and the even-numbered line data of one transfer unit into one transfer unit of DMA and outputs the resultant transfer unit to the bus interface unit 132. In the following description, the bundled preprocessed image data and address to be transferred in one DMA are collectively referred to as "data of one transfer unit".

A method by which the priority determination unit 131 bundles the odd-numbered line data of one transfer unit and the even-numbered line data of one transfer unit is not limited to the method described above. For example, the odd-numbered line data of one transfer unit and the even-numbered line data of one transfer unit may be bundled into the data of one transfer unit so that the preprocessed image data of the odd-numbered line is transferred (written) subsequently to the preprocessed image data of the even-numbered line. For example, the odd-numbered line data of one transfer unit and the even-numbered line data of one transfer unit to be bundled into the data of one transfer unit may be changed according to an availability of each of the storage areas of the data buffer 113 and the address buffer 114 and the storage areas of the data buffer 123 and the address buffer 124.

The bus interface unit 132 exchanges (interfaces) the data of one transfer unit inputted from the priority determination unit 131 with the bus arbiter 70 based on protocol of DMA in the image processing device 1. More specifically, the bus interface unit 132 outputs a DMA request signal for access to the DRAM 72 to the bus arbiter 70 via the data bus 80. After the DMA request is accepted by the bus arbiter 70 and a DMA acceptance signal is inputted via the data bus 80, the bus interface unit 132 outputs the data of one transfer unit inputted from the priority determination unit 131 to the bus arbiter 70 via the data bus 80.

In the data transfer control device 100 illustrated in FIG. 5, since the data buffer 113, the address buffer 114, the data buffer 123 and the address buffer 124 are provided with the storage areas which can perform DMA four times, the data transfer control device can continuously perform DMA with the bus arbiter 70 four times.

Next, a DMA operation performed between the data transfer control device 100 and the bus arbiter 70 will be described. First, a method of accessing the DRAM 72 in each processing block within the image processing device 1 will be described. FIGS. 6A to 6D are diagrams schematically illustrating an example of an image data transfer direction and the access to the DRAM 72 in the image processing device 1 to which the data transfer control device 100 in the first embodiment is applied. FIGS. 7A to 7D are diagrams schematically illustrating an example of access to the DRAM 72 corresponding to a case in which image data transfer directions are different in the image processing device 1 to which the data transfer control device 100 in the first embodiment is applied. A case in which an output channel of the image sensor 10 is one channel is shown to facilitate the description in the description of FIGS. 6A to 6D and FIGS. 7A to 7D.

Figures 6A, 6B, 6C, 6D:
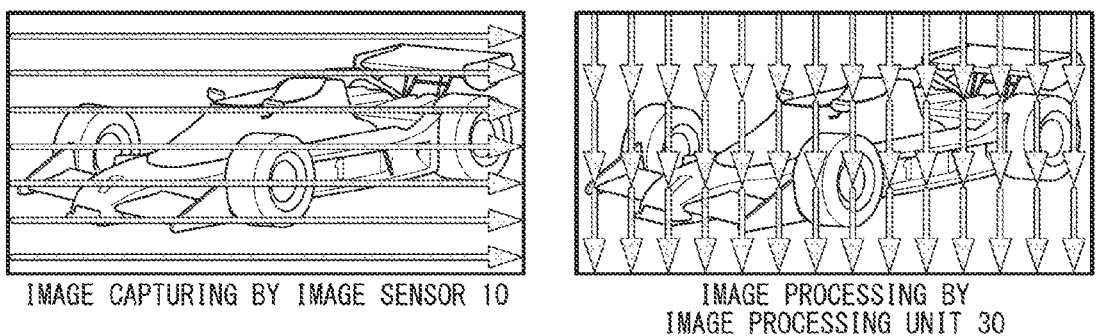
FIGS. 6A to 6D are diagrams schematically illustrating an example of a transfer direction of an image data and access to the DRAM in the image processing device to which the data transfer control device in the first embodiment is applied.

In the image processing device 1, there is a case that a direction in which the image sensor 10 acquires an image and a direction in which the image processing unit 30 performs image processing are different from each other. For example, as illustrated in FIG. 6A, as the image sensor 10 performs raster scan pixels and sequentially outputs the input image data in a horizontal direction (lateral direction) with respect to the image, the preprocessing unit 20 transfers (writes) the preprocessed image data to the DRAM 72 in the horizontal direction (lateral direction) with respect to the image. There is also a case that the image processing unit 30 divide the image into blocks having a predetermined size, and acquire (read) the preprocessed image data from the DRAM 72 in each block in a vertical direction (longitudinal direction).

In this case, respective preprocessed image data is considered to be stored in the DRAM 72, for example, as illustrated in FIG. 6B. A state in which the preprocessed image data in which addresses in an ascending order are sequentially assigned from a left side in each line of the image and addresses in an ascending order are sequentially assigned from top of the image is stored in the storage areas of corresponding banks of the DRAM 72 is illustrated in FIG. 6B.

In this case, the data transfer control device 100 which provides the image transfer unit 21 within the image processing device 1 continuously accesses different banks of the DRAM 72 in the horizontal direction (lateral direction) with respect to the image and transfers the preprocessed image data to the DRAM 72, as illustrated in FIG. 6C. The data transfer control device 200 which provides the image processing unit 30 within the image processing device 1 continuously accesses the same banks of the DRAM 72 in the vertical direction (longitudinal direction) with respect to the image and acquires the preprocessed image data from the DRAM 72, as illustrated in FIG. 6D. Therefore, the continuous access to the same banks of the DRAM 72 by the data transfer control device 200 produces much loss time for the reasons described above.

Figure 7A:
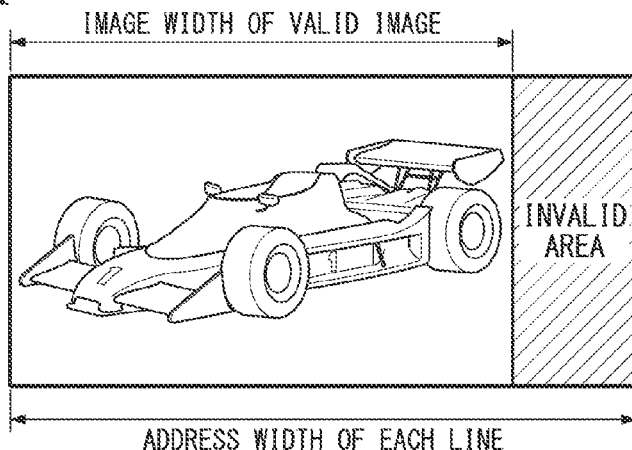
FIGS. 7A to 7D are diagrams schematically illustrating an example of access to the DRAM corresponding to a case in which transfer directions of the image data are different in the image processing device to which the data transfer control device in the first embodiment is applied.

It is considered to adopt a controlling method of adding an area (invalid area) of invalid image data to a right side of an area of valid image data (valid image) making a width in the horizontal direction (lateral direction) of the image wider than an image width in the horizontal direction (lateral direction) of the valid image and performing control, as illustrated in FIG. 7A. A width of addresses assigned in each line of the image, that is, a difference between a first address and a last address in each line, may be made greater than a width of addresses assigned in each line of the valid image using this method.

The banks of the DRAM 72 which are continuously accessed when the preprocessed image data is acquired in the vertical direction (longitudinal direction) by the data transfer control device 200 which provides the image processing unit 30 can be made to be different banks by adjusting a setting of the size of this invalid area, that is, the width of the address of the invalid area.

Figure 7B:
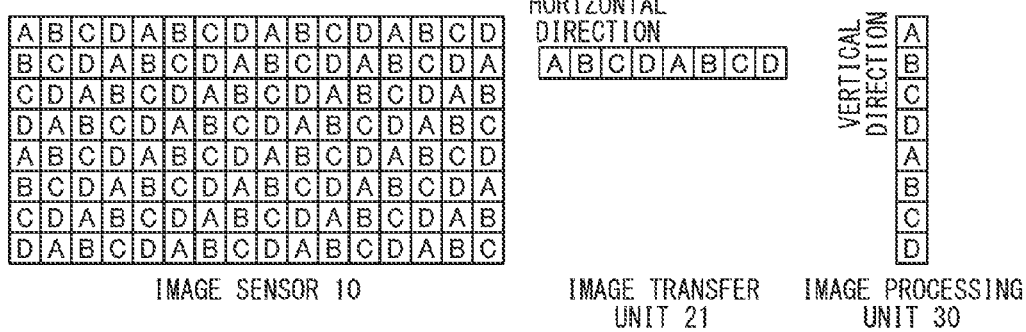

More specifically, when the size in the horizontal direction (lateral direction) of the invalid area is set to the same size as the bank of the DRAM 72, banks of the second and subsequent lines are shifted by one, and the preprocessed image data in the same position in the vertical direction (longitudinal direction) in the valid image is stored in the different bank of the DRAM 72, as illustrated in FIG. 7B. In this case, the data transfer control device 100 which provides the image transfer unit 21 accesses the respective banks of the DRAM 72 in the order of bank A, bank B, bank C and bank D in the horizontal direction (lateral direction) with respect to the image, as illustrated in FIG. 7B. The data transfer control device 200 which provides the image processing unit 30 accesses the respective banks of the DRAM 72 in the order of bank A, bank B, bank C and bank D in the vertical direction (longitudinal direction) with respect to the image. Accordingly, it is possible to prevent the continuous access to the same bank of the DRAM 72 in each of the data transfer control device 100 which provides the image transfer unit 21 and the data transfer control device 200 which provides the image processing unit 30.

Figure 7C:
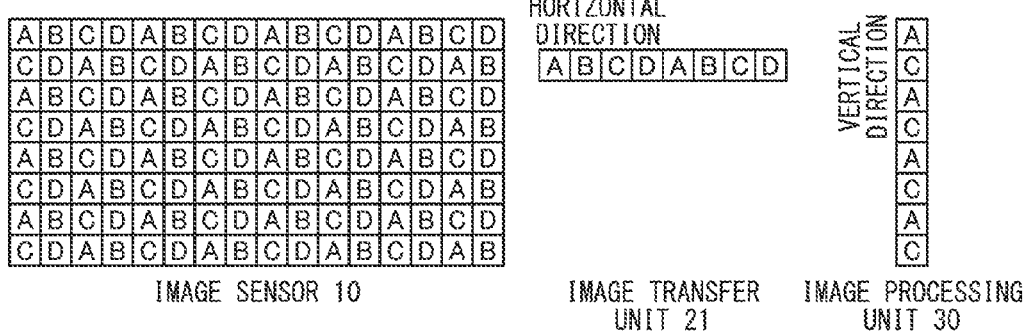

When the size in the horizontal direction (lateral direction) of the invalid area is set to the same size as two banks of the DRAM 72, the banks of the second and subsequent lines are shifted by two, and preprocessed image data in the same position in the vertical direction (longitudinal direction) in the valid image is stored in other banks, skipping over one bank, of the DRAM 72, as illustrated in FIG. 7C. In this case, the data transfer control device 100 which provides the image transfer unit 21 accesses the respective banks of the DRAM 72 in the order of bank A, bank B, bank C and bank D in the horizontal direction (lateral direction) with respect to the image, as illustrated in FIG. 7C. The data transfer control device 200 which provides the image processing unit 30 accesses the respective banks of the DRAM 72 in the order of bank A, bank C, bank A and bank C in the vertical direction (longitudinal direction) with respect to the image. Even in this case, the continuous access to the same bank of the DRAM 72 can be prevented in each of the data transfer control device 100 which provides the image transfer unit 21 and the data transfer control device 200 which provides the image processing unit 30. However, even when the access to different banks of the DRAM 72 is inserted as in this case, the period in which the continuous access to the same bank in the DRAM is not accepted may not end. Therefore, the remaining time of the period in which the DRAM 72 does not accept the access is likely to be the loss time.

Figure 7D:
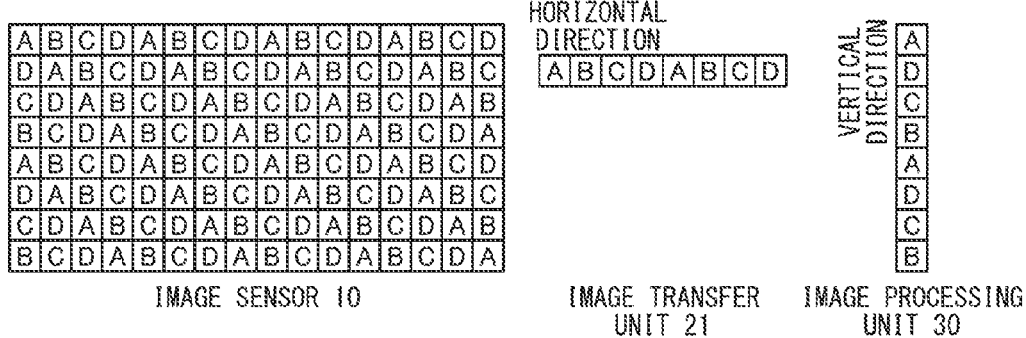

When the size in the horizontal direction (lateral direction) of the invalid area is set to the same size as three banks of the DRAM 72, the baths of the second and subsequent lines are shifted by three, and the preprocessed image data in the same position in the vertical direction (longitudinal direction) in the valid image is stored in other banks, skipping over two banks, of the DRAM 72, as illustrated in FIG. 7D. In this case, the data transfer control device 100 which provides the image transfer unit 21 accesses the respective banks of the DRAM 72 in the order of bank A, bank B, bank C and bank D in the horizontal direction (lateral direction) with respect to the image, as illustrated in FIG. 7D. The data transfer control device 200 which provides the image processing unit 30 accesses the respective banks of the DRAM 72 in the order of bank A, bank D, bank C and bank B in the vertical direction (longitudinal direction) with respect to the image. In this case, the continuous access to the same bank of the DRAM 72 can also be prevented in each of the data transfer control device 100 which provides the image transfer unit 21 and the data transfer control device 200 which provides the image processing unit 30.

Thus, the continuous access to the same bank of the DRAM 72 can be prevented by adding the invalid area to the right side of the area of the valid image. In both the example of access to the DRAM 72 illustrated in FIG. 7B and the example of access to the DRAM 72 illustrated in FIG. 7D, the bank access in the horizontal direction (lateral direction) with respect to the image and the bank access in the vertical direction (longitudinal direction) with respect to the image are efficiently performed. However, when the bank access to the DRAM 72 in another processing block which provides the image processing device 1 is considered, the access to the DRAM 72 illustrated in FIG. 713 is more efficient. This is because the other processing block which provides the image processing device 1 is considered to access the respective banks of the DRAM 72 in the order of bank A, bank B, bank C and bank D. In other words, this is because, when the entire image processing device 1 is considered, the access to the respective banks in the order of bank A, bank B, bank C and bank D in the vertical direction (longitudinal direction) as in the other processing block is more efficient than the access to the respective banks in the order of bank A, bank D, bank C, bank B in the vertical direction (longitudinal direction), as illustrated in FIG. 7D.

However, as described above, the image sensor 10 which provides the image processing device 1 includes two output channels which output the pixel signals, and simultaneously outputs input image data to the preprocessing unit 20 via the two lines. The image transfer unit 21 bundles the preprocessed image data of the two lines and transfers (writes) the resultant image data to the DRAM 72. When such a configuration of the image processing device 1 is considered, not all continuous access to the same bank of the DRAM 72 in the data transfer control device 100 which provides the image transfer unit 21 may be prevented by the method of adding and considering the invalid area to the right side of the area of the valid image.

For example, a case in which the size in the horizontal direction (lateral direction) of the invalid area is set to the same size as the bank of the DRAM 72 as illustrated in FIG. 7B is considered. In this case, if the preprocessed image data of the even-numbered line is bundled after the preprocessed image data of the odd-numbered line and transferred (written), the continuous access to the same bank of the DRAM 72 occurs when the preprocessed image data of the next odd-numbered line is transferred (written). More specifically, the data transfer control device 100 which provides the image transfer unit 21 accesses the banks in the order of bank B, bank C, bank D and bank A in the horizontal direction (lateral direction) with respect to the image and transfers (writes) the preprocessed image data of the even-numbered lines, subsequently to the preprocessed image data of the odd-numbered lines accessing the banks in the order of bank A, bank B, bank C and bank D in the horizontal direction (lateral direction) with respect to the same image. Then, if transferring (writing) of the preprocessed image data of the next odd-numbered line is performed, access to bank A of the even-numbered line and access to bank A of the next odd-numbered line are continuous with each other.

For example, if the size in the horizontal direction (lateral direction) of the invalid area is set to the same size as the two banks of the DRAM 72 as illustrated in FIG. 7B, the continuous access to the same bank of the DRAM 72 does not occur even when the preprocessed image data of the odd-numbered line and the preprocessed image data of the even-numbered line are bundled and transferred (written). However, there is a case that the period in which the continuous access to the same bank in the DRAM cannot be accepted does not end and remains, as described above. More specifically, the data transfer control device 100 which provides the image transfer unit 21 accesses the banks in the order of bank C, bank D, bank A and bank B in the horizontal direction (lateral direction) with respect to the image and transfers (writes) the preprocessed image data of the even-numbered lines, subsequently to the preprocessed image data of the odd-numbered lines accessing the banks in the order of bank A, bank B, bank C and bank D in the horizontal direction (lateral direction) with respect to the same image. The access of this case is an access which is inserted access to bank D of the odd-numbered line between access to bank C of the odd-numbered line and access to bank C of the even-numbered line. Similarly, only the access to one bank is inserted between access to bank D of the odd-numbered line and the access to bank D of the even-numbered line, between access to bank A of the even-numbered line and the access to bank A of the next odd-numbered line, and between access to bank B of the even-numbered line and access to bank B of the next odd-numbered line.

For example, a case in which the preprocessed image data of the even-numbered line is bundled after the preprocessed image data of the odd-numbered line and transferred (written) when the size in the horizontal direction (lateral direction) of the invalid area is set to the same size as three banks of the DRAM 72 as illustrated in FIG. 7D is considered. In this case, the continuous access to the same bank of the DRAM 72 occurs between the odd-numbered line and the even-numbered line. More specifically, the data transfer control device 100 which provides the image transfer unit 21 similarly accesses the banks in the order of bank D, bank A, bank B and bank C in the horizontal direction (lateral direction) with respect to the image and transfers (writes) the preprocessed image data of the even-numbered lines, subsequently to the preprocessed image data of the odd-numbered lines accessing the banks in the order of bank A, bank B, bank C and bank D in the horizontal direction (lateral direction) with respect to the image. Accordingly, the access to bank D of the odd-numbered line and the access to bank D of the even-numbered line are continuous with each other.

Therefore, in the image processing device 1, it is necessary to consider the bank access in the same horizontal direction (lateral direction), in addition to the bank access of the DRAM 72 in the horizontal direction (lateral direction) and the vertical direction (longitudinal direction) with respect to the image described above.

Next, a DMA operation in which the bank access in the same horizontal direction (lateral direction) in the data transfer control device 100 is considered will be described. In the following description, a DMA operation in the case in which the size in the horizontal direction (lateral direction) of the invalid area is set to the same size as the bank of the DRAM 72, which is illustrated in FIG. 7B, will be described.

FIGS. 8A and 8B are diagrams schematically illustrating an example of loss time caused by access to the banks of the DRAM 72 in the data transfer control device 100 of the first embodiment. A timing, when the data transfer control device 100 which provides the image transfer unit 21 bundles preprocessed image data corresponding to a first line and a second line of the image sensor 10 and transfers the resultant image data to the DRAM 72, is illustrated in FIG. 8A. A timing when the data transfer control device 100 which provides the image transfer unit 21 bundles preprocessed image data corresponding to a third line and a fourth line of the image sensor 10 and transfers the resultant image data to the DRAM 72 is illustrated in FIG. 8B.

As described above, when the size in the horizontal direction (lateral direction) of the invalid area is set to the same size as the bank of the DRAM 72, the preprocessed image data of the even-numbered line is bundled after the preprocessed image data of the odd-numbered line and transferred (written) to the DRAM 72, such that the continuous access to the same bank of the DRAM 72 occurs when preprocessed image data of the next odd-numbered line is transferred (written). Accordingly, efficiency of access to the DRAM 72 in the image transfer unit 21 is degraded.

More specifically, the data manipulation unit 130 in the data transfer control device 100 which provides the image transfer unit 21 bundles the preprocessed image data of the second line (even-numbered line) accessing the respective banks of the DRAM 72 in the order of bank B, bank C, bank D and bank A, subsequently to the preprocessed image data of the first line (odd-numbered line) accessing the respective banks of the DRAM 72 in the order of bank A, bank B, bank C and bank D, as illustrated in FIG. 8A. The data manipulation unit 130 transfers the bundled preprocessed image data to the corresponding banks of the DRAM 72. Then, when the data manipulation unit 130 transfers the next preprocessed image data which is similarly bundled to the corresponding banks of the DRAM 72, access to bank A in the bundled preprocessed image data which is transferred at first and access to bank A in the bundled preprocessed image data which is transferred next are continuous. In this case, since the DRAM 72 cannot accept the continuous access to bank A, a corresponding period is loss time, and efficiency of access to the DRAM 72 is degraded.

The data manipulation unit 130 in the data transfer control device 100 which provides the image transfer unit 21 bundles the preprocessed image data of the fourth line (even-numbered line) accessing the respective banks of the DRAM 72 in the order of bank D, bank A, bank B and bank C subsequent to the preprocessed image data of the third line (odd-numbered line) accessing the respective banks of the DRAM 72 in the order of bank C, bank D, bank A and bank B, as illustrated in FIG. 8B. The data manipulation unit 130 transfers the bundled preprocessed image data to the corresponding bank of the DRAM 72. Then, when the data manipulation unit 130 transfers the next preprocessed image data which is bundled similarly to the corresponding bank of the DRAM 72, access to bank C in the bundled preprocessed image data which is transferred at first and access to bank C in the bundled preprocessed image data which is transferred next are continuous. In this case, since the DRAM 72 cannot accept continuous access to bank C, the corresponding period is loss time, and efficiency of access to the DRAM 72 is degraded.

Figure 9:
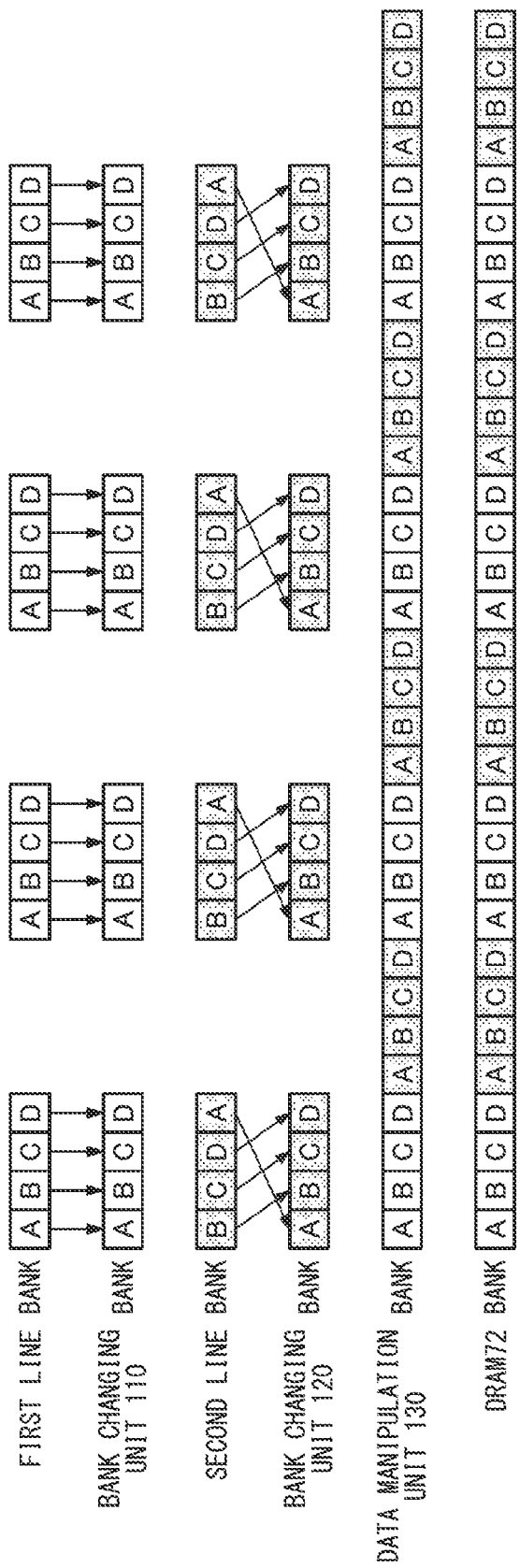
FIG. 9 is a diagram schematically illustrating an example of prevention of loss time caused by access to the banks of the DRAM through a process of changing the banks in the data transfer control device of the first embodiment.
Figure 10:
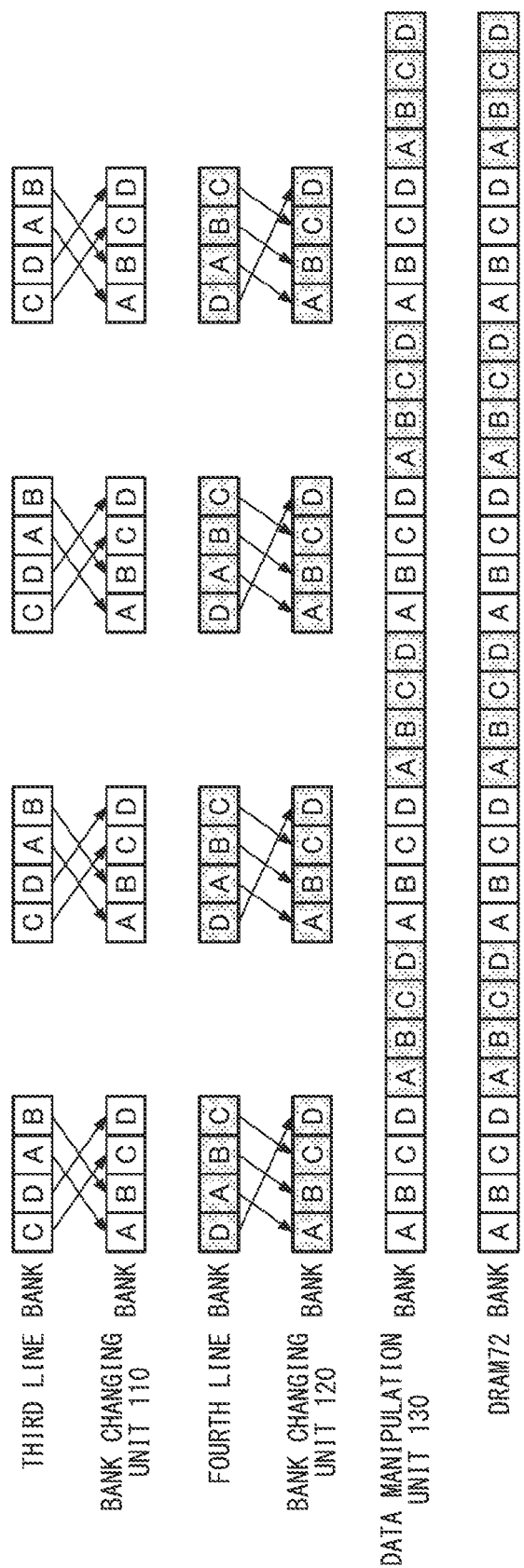
FIG. 10 is a diagram schematically illustrating an example of prevention of loss time caused by access to the banks of the DRAM through a process of changing the banks in the data transfer control device of the first embodiment.

Therefore, in the data transfer control device 100 which provides the image transfer unit 21, the bank changing unit 110 and the bank changing unit 120 change the order of the banks accessed when the preprocessed image data of the corresponding line is transferred (written) to the DRAM 72, thereby preventing the continuous access to the same bank of the DRAM 72. FIGS. 9 and 10 are diagrams schematically illustrating an example of prevention of the loss time caused by access to the banks of the DRAM 72 through a process of changing the banks in the data transfer control device 100 of the first embodiment. A timing when the data transfer control device 100 which provides the image transfer unit 21 bundles the preprocessed image data corresponding to the first line and the second line of the image sensor 10 and transfers the resultant image data to the DRAM 72, as in the access to the banks of the DRAM 72 illustrated in FIG. 8A, is illustrated in FIG. 9. A timing when the data transfer control device 100 which provides the image transfer unit 21 bundles the preprocessed image data corresponding to the third line and the fourth line of the image sensor 10 and transfers the resultant image data to the DRAM 72, as in the access to the banks of the DRAM 72 illustrated in FIG. 8B, is illustrated in FIG. 10.

As illustrated in FIGS. 9 and 10, when the size in the horizontal direction (lateral direction) of the invalid area is set to the same size as the bank of the DRAM 72, the preprocessed image data of the even-numbered line is bundled after the preprocessed image data of the odd-numbered line and transferred (written) to the DRAM 72, such that the continuous access to the same bank of the DRAM 72 occurs when the preprocessed image data of the next odd-numbered line is transferred (transferred), as in the access to the banks of the DRAM 72 illustrated in FIG. 8. However, the bank changing unit 110 and the bank changing unit 120 in the data transfer control device 100 which provides the image transfer unit 21 change the order of the banks accessed when the preprocessed image data of the respective lines is transferred (written) to the DRAM 72, as illustrated in FIGS. 9 and 10. Accordingly, the image transfer unit 21 can prevent the continuous access to the same bank of the DRAM 72 through bank interleave.

More specifically, as illustrated in FIG. 9, the preprocessed image data of the first line (odd-numbered line) accessing the respective banks of the DRAM 72 in the order of bank A, bank B, bank C and bank D and the preprocessed image data of the second line (even-numbered line) accessing the respective banks of the DRAM 72 in the order of bank B, bank C, bank D and bank A are inputted to the data transfer control device 100, as in FIG. 8A. In this case, the bank changing unit 110 in the data transfer control device 100 directly outputs the preprocessed image data of the first line (odd-numbered line) accessing the respective banks of the DRAM 72 in the order of bank A, bank B, bank C and bank D to the data manipulation unit 130. The bank changing unit 120 in the data transfer control device 100 changes the preprocessed image data of the second line (even-numbered line) accessing the respective banks of the DRAM 72 in the order of bank B, bank C, bank D and bank A such that the respective banks of the DRAM 72 are accessed in the order of bank A, bank B, bank C and bank D as in the preprocessed image data of the first line (odd-numbered line), and outputs the resultant image data to the data manipulation unit 130. The data manipulation unit 130 bundles the preprocessed image data of the second line (even-numbered line) whose order of the banks has been changed, subsequent to the preprocessed image data of the first line (odd-numbered line). The data manipulation unit 130 transfers the bundled preprocessed image data to the corresponding banks of the DRAM 72. Accordingly, it is possible to prevent the continuous access to the same bank of the DRAM 72 when the data manipulation unit 130 transfers the next preprocessed image data which is similarly bundled to the corresponding banks of the DRAM 72.

As illustrated in FIG. 10, the preprocessed image data of the third line (odd-numbered line) accessing the respective banks of the DRAM 72 in the order of bank C, bank D, bank A and bank B and the preprocessed image data of the fourth line (even-numbered line) accessing the respective banks of the DRAM 72 in the order of bank D, bank A, bank B and bank C are inputted to the data transfer control device 100, as in FIG. 8B. In this case, the bank changing unit 110 in the data transfer control device 100 changes the preprocessed image data of the third line (odd-numbered line) accessing the respective banks of the DRAM 72 in the order of bank C, bank D, bank A and bank B such that the respective banks of the DRAM 72 are accessed in the order of bank A, bank B, bank C and bank D, as in the preprocessed image data of the first line (odd-numbered line). Further, the bank changing unit 110 outputs the resultant image data to the data manipulation unit 130. The bank changing unit 120 in the data transfer control device 100 changes the preprocessed image data of the fourth line (even-numbered line) accessing the respective banks of the DRAM 72 in the order of bank D, bank A, bank B and bank C such that the respective banks of the DRAM 72 are accessed in the order of bank A, bank B, bank C and bank D, as in the preprocessed image data of the first line (odd-numbered line). Further, the bank changing unit 120 outputs the resultant image data to the data manipulation unit 130. The data manipulation unit 130 bundles the preprocessed image data of the fourth line (even-numbered line) whose order of the banks has been changed, subsequent to the preprocessed image data of the third line (odd-numbered line) whose order of the banks has been changed. The data manipulation unit 130 transfers the bundled preprocessed image data to the corresponding bank of the DRAM 72. Accordingly, it is possible to prevent the continuous access to the same bank of the DRAM 72 even when the data manipulation unit 130 transfers the next preprocessed image data which is similarly bundled to the corresponding bank of the DRAM 72.

Thus, in the data transfer control device 100, when the preprocessed image data of the respective lines is stored in the data buffer 113 or the data buffer 123, the order of the banks accessed when the preprocessed image data of the respective lines is transferred (written) to the DRAM 72 is changed. In the data transfer control device 100, the preprocessed image data of the respective lines is read in the order of storage in each of the data buffer 113 or the data buffer 123, the read preprocessed image data of the respective lines is bundled, and the bundled preprocessed image data is transmitted to the corresponding banks of the DRAM 72 by DMA.

As described above, when preprocessed image data simultaneously input via two lines is stored in the data buffer 113 or the data buffer 123, the data transfer control device 100 of the first embodiment changes the order of the banks accessed when the preprocessed image data of the respective lines is transferred (written) to the DRAM 72 by changing the order of storing either or both of the pieces of preprocessed image data. Accordingly, in the data transfer control device 100, the accessing order of the banks when the preprocessed image data which is simultaneously inputted via two lines is transmitted (written) to the DRAM 72 can be the same order in all the lines. The data transfer control device 100 bundles the preprocessed image data of the respective lines whose order of access to the bank has been changed into one piece of preprocessed image data and outputs the resultant image data to the bus arbiter 70 via the data bus 80 through transfer by DMA. Accordingly, in the data transfer control device 100, it is possible to transfer (write) the preprocessed image data simultaneously input via the two lines to the DRAM 72 without increasing the number of processing blocks which perform the transfer to the DRAM 72. Accordingly, even when a processing block used to simultaneously process a plurality of pieces of data is which provides the image processing device 1, it is possible to prevent the continuous access to the same bank of the DRAM 72 through bank interleave, suppress degradation of the efficiency of access to the DRAM 72 due to the loss time, and increase efficiency of access to the DRAM 72.

In the first embodiment, the case, where the banks of the DRAM 72 correspond to which the respective storage areas in the data buffer 113 and the data buffer 123 and the banks of the DRAM 72 correspond to which the respective storage areas in the address buffer 114 and the address buffer 124 which provides the data transfer control device 100 are determined in advance, that is, the corresponding banks are fixed, and the preprocessed image data and the addresses of the respective banks are stored in the corresponding storage areas, as illustrated in FIG. 5, has been described. Thus, as the banks of the DRAM 72 correspond to which the respective storage areas in the data buffer 113 and the data buffer 123 and the banks of the DRAM 72 correspond to which the respective storage areas in the address buffer 114 and the address buffer 124 correspond are determined in advance, the stored preprocessed image data can be output to the DRAM 72 in the same bank order irrespective of the order in which the preprocessed image data of the respective banks are inputted to the data transfer control device 100 (see FIGS. 9 and 10).

In the first embodiment, the case in which one preprocessed image data corresponding to each of bank A, bank B, bank C and bank D is necessarily which provides the odd-numbered line data of one transfer unit and the even-numbered line data of one transfer unit has been described. However, the one piece of preprocessed image data corresponding to each of bank A, bank B, bank C and bank D may not necessarily be which provides the preprocessed image data input to the data transfer control device 100. In this case, the banks correspond to which the storage areas of the respective buffers can be appropriately changed, for example, the preprocessed image data corresponding to different banks is stored in the respective storage areas in the data buffer 113 and the data buffer 123 and the respective storage areas in the address buffer 114 and the address buffer 124. For example, a case in which the preprocessed image data input in the order of bank A, bank B, bank A and bank B is stored in the same storage area group in the data buffer 113 is considered. In this case, the banks may be changed so that preprocessed image data of the first bank A is stored in a storage area corresponding to bank A, preprocessed image data of the first bank B is stored in a storage area corresponding to bank B, preprocessed image data of the second bank A is stored in a storage area corresponding to bank C, and preprocessed image data of the second bank B is stored in a storage area corresponding to bank D.

In the first embodiment, the configuration in which the storage areas of the data buffer 113 and the data buffer 123 and the storage areas of the address buffer 114 and the address buffer 124 which store the preprocessed image data and the addresses to be outputted through DMA transfer are changed has been described. In other words, the configuration in which the order of the banks for access to the DRAM 72 is changed when the preprocessed image data of the respective lines and the addresses are stored in the data buffer 113 and the data buffer 123, and the address buffer 114 and the address buffer 124 which provides the data transfer control device 100 has been described. However, the configuration in which the order of banks for access to the DRAM 72 is changed is not limited to the configuration shown in the first embodiment. For example, a configuration in which the storage areas of the data buffer 113 and the data buffer 123 and the storage areas of the address buffer 114 and the address buffer 124 which reads the preprocessed image data and the addresses outputted through DMA transfer are changed may be adopted. In other words, in the data transfer control device 100, when the preprocessed image data and the addresses stored in the data buffer 113 or the data buffer 123 and the address buffer 114 or the address buffer 124 are read and outputted by DMA, the order of banks for access to the DRAM 72 may be changed. In this case, for example, a configuration in which the CPU 60 sets, in the reading order register which is not illustrated, the order of reading the preprocessed image data stored in the data buffer 113, and the buffer reading control unit 115 controls reading of the preprocessed image data stored in the data buffer 113 and the addresses stored in the address buffer 114 according to the information of the order of reading the preprocessed image data which has been set in the reading order register, which is not illustrated, is considered.

In the first embodiment, the configuration in which the dedicated data buffer which stores the preprocessed image data and the dedicated address buffer are included for each of the simultaneously input lines has been described. In other words, the configuration in which the data buffer 113 and the address buffer 114 corresponding to the preprocessed image data of the odd-numbered line and the data buffer 123 and the address buffer 124 corresponding to the preprocessed image data of the even-numbered line are included has been described. However, the configuration for storing the preprocessed image data of the respective lines and the addresses is not limited to the configuration shown in the first embodiment. For example, a configuration in which one data buffer and one address buffer correspond to preprocessed image data of all the lines may be adopted.

While the data transfer control device 100 has been described in the first embodiment, the data transfer control device 200 and the data transfer control device 300 illustrated in FIG. 1 differ from the data transfer control device 100 in only a data input and output direction and are the same as the data transfer control device 100 in a basic data input and output method. Therefore, a detailed description of each of the data transfer control device 200 and the data transfer control device 300 of the first embodiment is omitted.

<Second Embodiment>

Figure 11:
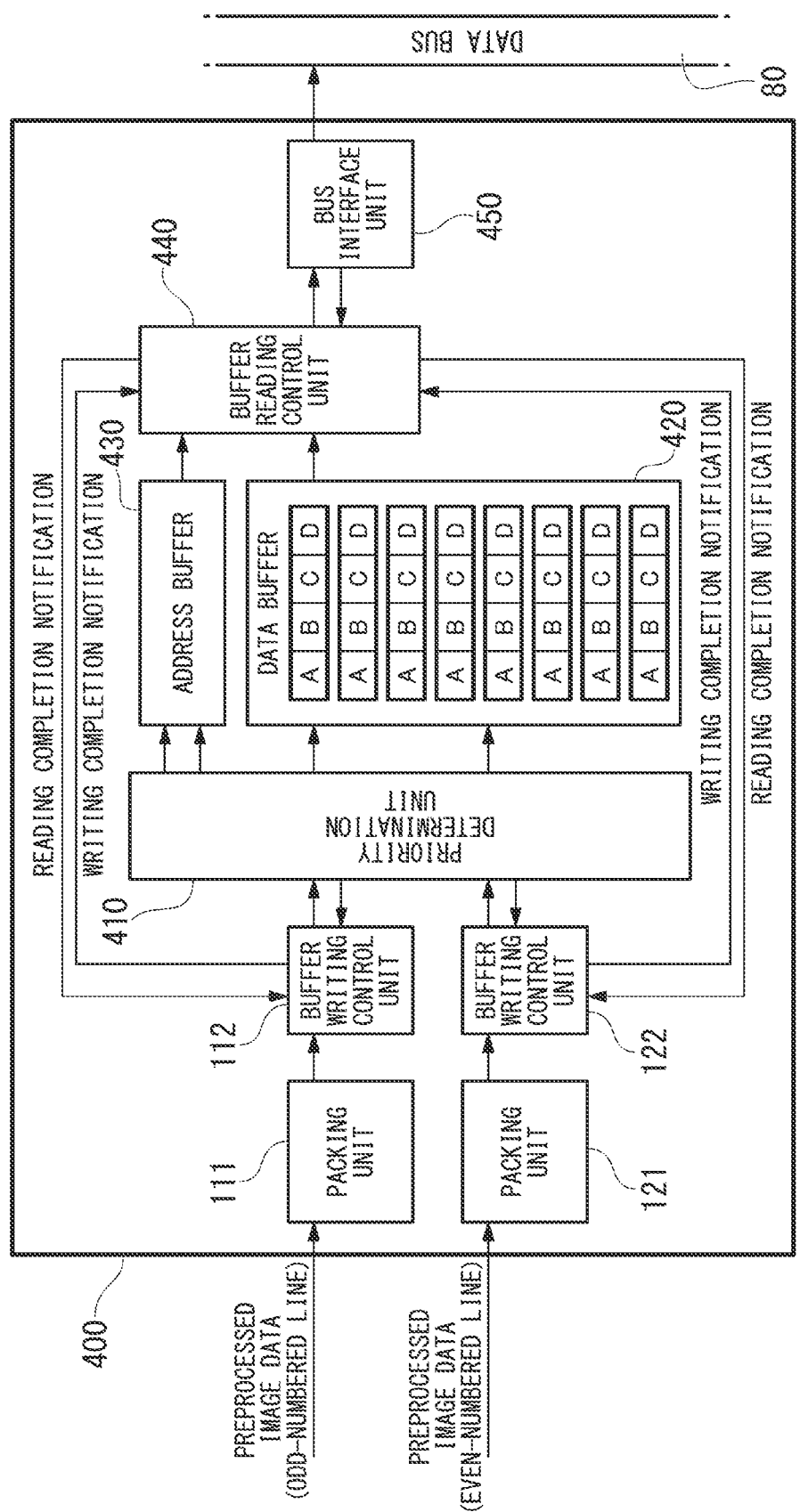
FIG. 11 is a block diagram illustrating a schematic configuration of a data transfer control device of a second embodiment of the present invention.

Next, a data transfer control device of a second embodiment of the present invention will be described. FIG. 11 is a block diagram illustrating a schematic configuration of the data transfer control device in the second embodiment. The data transfer control device 400 illustrated in FIG. 11 is applied to the image processing device 1 in place of the data transfer control device 100 of the first embodiment. In FIG. 11, the data transfer control device 400 includes a packing unit 111, a buffer writing control unit 112, a packing unit 121, a buffer writing control unit 122, a priority determination unit 410, a data buffer 420, an address buffer 430, a buffer reading control unit 440, and a bus interface unit 450.

In the block diagram of the data transfer control device 400 of the second embodiment illustrated in FIG. 11, the same components as those in the data transfer control device 100 of the first embodiment illustrated in FIG. 5 are denoted with the same reference signs. In the following description, only an operation of components different from those of the data transfer control device 100 of the first embodiment will be described, and a detailed description of an operation of the same components as those of the data transfer control device 100 of the first embodiment is omitted.

The data transfer control device 400 bundles preprocessed image data of an odd-numbered line and preprocessed image data of an even-numbered line into one piece of preprocessed image data and outputs a DMA request signal for transferring (writing) the one piece of preprocessed image data to the DRAM 72 via the data bus 80, to the bus arbiter 70 via the data bus 80, as in the data transfer control device 100 of the first embodiment. In this case, the data transfer control device 400 collects preprocessed image data of a plurality of odd-numbered lines and preprocessed image data of a plurality of even-numbered lines to be transferred to the DRAM 72 so that the order of banks for access to the DRAM 72 is continuous in a predetermined order, as in the data transfer control device 100 of the first embodiment. Thereafter, the data transfer control device 400 bundles the preprocessed image data of the odd-numbered lines and the preprocessed image data of the even-numbered lines, which have been collected, and then outputs the DMA request signal to the bus arbiter 70. After the DMA request is accepted by the bus arbiter 70 and a DMA acceptance signal is inputted, the data transfer control device 400 outputs the one piece of bundled preprocessed image data to be continuous in a predetermined bank order to the bus arbiter 70 via the data bus 80, as in the data transfer control device 100 of the first embodiment. Accordingly, in the image processing device 1, the bus arbiter 70 and the DRAM interface unit 71 operate according to the DMA from the data transfer control device 400, and the one piece of preprocessed image data outputted from the data transfer control device 400 is written to the storage area corresponding to an address of the DRAM 72 designated in the data transfer control device 400.

In the following description, a case in which address space of the DRAM 72, which is a destination to which the data transfer control device 400 transfers the preprocessed image data, includes four banks (bank A, bank B, bank C and bank D), as in the data transfer control device 100, will be described. In the following description, a case where access through bank interleave in which continuous access to the four banks of the DRAM 72 is performed twice in succession through one DMA is one transfer unit of DMA in the data transfer control device 400, as in the data transfer control device 100, will be described.

The buffer writing control unit 112 sequentially outputs the packed preprocessed image data of the odd-numbered lines and the addresses inputted from the packing unit 111, that is, odd-numbered line data of one transfer unit to the priority determination unit 410. When outputting of an amount of the odd-numbered line data of one transfer unit to be transferred to the DRAM 72 by one DMA to the priority determination unit 410 is completed, the buffer writing control unit 112 outputs a writing completion notification to the buffer reading control unit 440. The writing completion notification indicates that outputting of the odd-numbered line data of one transfer unit to the priority determination unit 410 is completed, that is, that one DMA is ready.

When a reading completion notification is inputted from the buffer reading control unit 440, the buffer writing control unit 112 determines that there is available space in the storage areas of the data buffer 420 and the address buffer 430, and starts output of the next odd-numbered line data of one transfer unit to the priority determination unit 410. This reading completion notification indicates that the reading of the odd-numbered line data of one transfer unit stored in the data buffer 420 and the address buffer 430 is completed.

The buffer writing control unit 122 sequentially outputs the packed preprocessed image data of the even-numbered lines and the addresses inputted from the packing unit 121, that is, even-numbered line data of one transfer unit, to the priority determination unit 410. When output of the even-numbered line data of one transfer unit corresponding to an amount to be transferred to the DRAM 72 by one DMA to the priority determination unit 410 is completed, the buffer writing control unit 122 outputs a writing completion notification to the buffer reading control unit 440. This writing completion notification indicates that output of the even-numbered line data of one transfer unit of the even-numbered line to the priority determination unit 410 is completed, that is, indicates that one DMA is ready.

When a reading completion notification is inputted from the buffer reading control unit 440, the buffer writing control unit 122 determines that there is available space in the storage areas of the data buffer 420 and the address buffer 430, and starts output of the next even-numbered line data of one transfer unit to the priority determination unit 410. This reading completion notification indicates that reading of the even-numbered line data of one transfer unit stored in the data buffer 420 and the address buffer 430 is completed.

The priority determination unit 410 stores, in the data buffer 420, the preprocessed image data of the odd-numbered lines inputted from the buffer writing control unit 112 and the preprocessed image data of the even-numbered lines inputted from the buffer writing control unit 122 based on predetermined priority when the preprocessed image data is transferred (written). In this case, the priority determination unit 410 changes either or both of the preprocessed image data of the odd-numbered lines and the preprocessed image data of the even-numbered lines to be stored in the data buffer 420 according to an order of access to the banks when the preprocessed image data of the odd-numbered lines or the preprocessed image data of the even-numbered lines is transferred (written) to the DRAM 72. Since a method by which the priority determination unit 410 changes the order of the banks accessed when the preprocessed image data of the odd-numbered lines or the preprocessed image data of the even-numbered lines is transferred (written) to the DRAM 72 is the same as that in the data transfer control device 100 of the first embodiment, a detailed description thereof is omitted here.

A method by which the priority determination unit 410 stores the preprocessed image data of the odd-numbered lines and the preprocessed image data of the even-numbered lines in the data buffer 420 includes a method of storing the preprocessed image data of the odd-numbered lines and the preprocessed image data of the even-numbered lines in the data buffer 420 at different timings based on the predetermined priority when the preprocessed image data is transferred (written).

More specifically, for example, when the preprocessed image data of the odd-numbered lines consists of 8 bits, a timing at which the packing unit 111 packs sequentially inputted preprocessed image data of four odd-numbered lines and completes generation of the preprocessed image data of the odd-numbered line of 32 bits is once every four cycles even when the preprocessed image data of the odd-numbered lines is inputted to the packing unit 111 in one cycle. Similarly, a timing at which the packing unit 121 completes generation of the packed preprocessed image data of the even-numbered line which consists of 32 bits is once every four cycles. Here, if the priority determination unit 410 is capable of storing the preprocessed image data of the odd-numbered lines or the preprocessed image data of the even-numbered lines in the data buffer 420 in one cycle, there are three spare times in the four cycles in the priority determination unit 410 for each of the preprocessed image data of the odd-numbered lines and the preprocessed image data of the even-numbered lines. The priority determination unit 410 stores both the preprocessed image data of the odd-numbered lines and the preprocessed image data of the even-numbered lines in the data buffer 420 within the time of four cycles using the spare time. In other words, the priority determination unit 410 stores both the preprocessed image data of the odd-numbered lines and the preprocessed image data of the even-numbered lines in the data buffer 420 at any two cycles within the time of the four cycles by shifting a timing at which the preprocessed image data of the odd-numbered lines and the preprocessed image data of the even-numbered lines are stored in the data buffer 420 within the time of the four cycles.

The priority determination unit 410 stores, in the address buffer 430, addresses of the DRAM 72 which transfer the preprocessed image data of the odd-numbered lines inputted from the buffer writing control unit 112 and addresses of the DRAM 72 which transfer the preprocessed image data of the even-numbered lines inputted from the buffer writing control unit 122 is transferred, based on the predetermined priority when the preprocessed image data is transferred (written). In this case, a method by which the priority determination unit 410 stores, in the address buffer 430, the addresses of the DRAM 72 which transfer the preprocessed image data of the odd-numbered lines and the addresses of the DRAM 72 which transfer the preprocessed image data of the even-numbered lines is the same as the method of storing the preprocessed image data of the odd-numbered lines and the preprocessed image data of the even-numbered lines in the data buffer 420.

The data buffer (buffer unit) 420 is a storage unit which temporally stores a plurality of packed preprocessed image data of odd-numbered lines and a plurality of packed preprocessed image data of even-numbered lines sequentially inputted from the priority determination unit 410 according to control of the priority determination unit 410. For example, the data buffer 420 includes an SRAM or the like. The number of storage areas which store the preprocessed image data of a plurality of odd-numbered lines to be transferred to corresponding banks of the DRAM 72 and storage areas which store the preprocessed image data of a plurality of even-numbered lines, which have been held in the data buffer 420, corresponds to the number of banks which provides the DRAM 72. For example, the data buffer 420 includes four storage areas having a storage capacity of 16 pieces of packed preprocessed image data of the odd-numbered lines which consists of 32 bits inputted from the priority determination unit 410 and four storage areas having a storage capacity of 16 pieces of packed preprocessed image data of the even-numbered lines which consists of 32 bits inputted from the priority determination unit 410 according to the number of banks which provides the DRAM 72. In other words, the data buffer 420 includes four storage areas which consists of 64 bytes corresponding to the preprocessed image data of the odd-numbered lines and four storage areas which consists of 64 bytes corresponding to the preprocessed image data of the even-numbered lines according to the number of banks which provides the DRAM 72. The data buffer 420 sequentially outputs the preprocessed image data of the odd-numbered lines or the preprocessed image data of the even-numbered lines stored in the respective storage areas to the buffer reading control unit 440 according to control of the buffer reading control unit 440.

In the configuration of the data transfer control device 400 illustrated in FIG. 11, four storage area groups in which four storage areas constitute one set are included for each of the preprocessed image data of the odd-numbered lines and the preprocessed image data of the even-numbered lines. In the data transfer control device 400, the preprocessed image data of all odd-numbered lines stored in the storage area group is the preprocessed image data of the odd-numbered lines which provides the odd-numbered line data of one transfer unit. In the data transfer control device 400, preprocessed image data of all even-numbered lines stored in the storage area group is the preprocessed image data of the even-numbered lines which provides the even-numbered line data of one transfer unit. With this configuration, the data transfer control device 400 can perform burst transfer four times. In this burst transfer, two burst transfers in which the 16 pieces of preprocessed image data of odd-numbered lines which consist of 32 bits and the 16 pieces of preprocessed image data of even-numbered lines which consist of 32 bits are transferred to the respective banks of the DRAM 72, continuously to the four banks, are performed. Here, reference signs described in the respective storage areas indicate the banks of the DRAM 72 which corresponds to the respective storage areas.

In the data transfer control device 400 of the second embodiment, a timing at which the preprocessed image data of the odd-numbered lines and the preprocessed image data of the even-numbered lines are written to the data buffer 420 and a timing at which the preprocessed image data of the odd-numbered lines and the preprocessed image data of the even-numbered lines are read from the data buffer 420 are not particularly limited. Therefore, the data buffer 420 may be an SRAM in which the data writing timing and the data reading timing can be controlled at different timings. In other words, a write clock which is the timing at which the preprocessed image data of the odd-numbered lines and the preprocessed image data of the even-numbered lines are written to the data buffer 420 and a read clock which is the timing at which the preprocessed image data of the odd-numbered lines and the preprocessed image data of the even-numbered lines are read from the data buffer 420 may be made to be different clocks by making the operation clock of the priority determination unit 410 and the operation clock of the buffer reading control unit 440 different.

The address buffer (buffer unit) 430 is a storage unit which temporally stores addresses of the DRAM 72 inputted from the priority determination unit 410 according to control of the priority determination unit 410. The address buffer 430 has the same configuration as the data buffer 420. In other words, the address buffer 430 is a storage unit which stores addresses for designating the banks of the DRAM 72 which is a destination to which the preprocessed image data of the odd-numbered lines and the preprocessed image data of the even-numbered lines stored in the data buffer 420 are transferred (written). The address buffer 430 has storage areas corresponding to the respective storage areas in the data buffer 420, and the number of storage areas which provides the address buffer 430 corresponds to the number of those of the data buffer 420. However, a storage capacity of the storage areas of the address buffer 430 is not limited to the same storage capacity as that of the storage areas of the data buffer 420. The storage capacity of the storage areas of the address buffer 430 is a storage capacity necessary to store addresses designated when the preprocessed image data of the odd-numbered lines and the preprocessed image data of the even-numbered lines stored in the storage area of the data buffer 420 are transferred to the DRAM 72. The address buffer 430 sequentially outputs the addresses stored in the respective storage areas to the buffer reading control unit 440 according to control of the buffer reading control unit 440.

In the configuration of the data transfer control device 400 illustrated in FIG. 11, four storage area groups in which four storage areas constitute one set are included for each of the preprocessed image data of the odd-numbered lines and the preprocessed image data of the even-numbered lines, as in the data buffer 420. In the data transfer control device 400, addresses of the preprocessed image data of all odd-numbered lines stored in the storage area group are addresses which provide the odd-numbered line data of one transfer unit. In the data transfer control device 400, addresses of the preprocessed image data of all even-numbered lines stored in the storage area group are addresses which provide the even-numbered line data of one transfer unit. With this configuration, the data transfer control device 400 can perform burst transfer four times. For this burst transfer, two burst transfers in which 16 pieces of packed preprocessed image data of the odd-numbered lines and 16 pieces of packed preprocessed image data of the even-numbered lines are transferred to the respective banks of the DRAM 72 continuously to the four banks are performed. In the configuration of the data transfer control device 400 illustrated in FIG. 11, reference signs indicating the respective storage areas in the address buffer 430 and the banks of the DRAM 72 to which the respective storage areas correspond are omitted.

In the data transfer control device 400 of the second embodiment, a timing at which the preprocessed image data of the odd-numbered lines and the preprocessed image data of the even-numbered lines are written to the address buffer 430 and a timing at which the preprocessed image data of the odd-numbered lines and the preprocessed image data of the even-numbered lines are read from the address buffer 430 are not also particularly limited. The data buffer 420 and the address buffer 430 may not necessarily be individual buffers, and may have a configuration in which a data buffer area and an address buffer area are provided in different storage areas of the same SRAM.

When a writing completion notification is inputted from both of the buffer writing control unit 112 and the buffer writing control unit 122, the buffer reading control unit 440 determines that storing of the odd-numbered line data of one transfer unit and the even-numbered line data of one transfer unit in the storage areas of the data buffer 420 and the address buffer 430 is completed. The buffer reading control unit 440 sequentially reads the packed preprocessed image data of the odd-numbered lines and the packed preprocessed image data of the even-numbered lines stored in the data buffer 420, and the addresses of the DRAM 72 to which the preprocessed image data of the odd-numbered lines is transferred and the addresses of the DRAM 72 to which the preprocessed image data of the even-numbered lines is transferred, which have been stored in the address buffer 430, in cooperation with the bus interface unit 450.

The buffer reading control unit 440 bundles the read preprocessed image data and the addresses of the odd-numbered lines and the read preprocessed image data and the addresses of the even-numbered lines into one preprocessed image data and address. More specifically, the buffer reading control unit 440 bundles the preprocessed image data of the odd-numbered lines and the addresses and the preprocessed image data of the even-numbered lines and the addresses into one preprocessed image data and address to transfer (write) the preprocessed image data of the even-numbered lines subsequently to the preprocessed image data of the odd-numbered lines. The buffer reading control unit 440 outputs the bundled preprocessed image data and address to the bus interface unit 450. In other words, the buffer reading control unit 440 outputs data of one transfer unit obtained by bundling the odd-numbered line data of one transfer unit and the even-numbered line data of one transfer unit into one transfer unit of DMA to the bus interface unit 450.

A method by which the buffer reading control unit 440 bundles the odd-numbered line data of one transfer unit and the even-numbered line data of one transfer unit is not limited to the above-described method and, for example, the odd-numbered line data of one transfer unit and the even-numbered line data of one transfer unit may be bundled into the data of one transfer unit so that the preprocessed image data of the odd-numbered lines is transferred (written) subsequently to the preprocessed image data of the even-numbered lines. For example, the odd-numbered line data of one transfer unit and the even-numbered line data of one transfer unit to be bundled into the data of one transfer unit may be changed according to an availability of the storage areas of the data buffer 420 and the address buffer 430.

When reading of an amount of the preprocessed image data of the odd-numbered lines and the addresses to be transferred to the DRAM 72 by one DMA, from the data buffer 420 and the address buffer 430, is completed, the buffer reading control unit 440 outputs a reading completion notification to the buffer writing control unit 112. This reading completion notification indicates that the reading of the preprocessed image data of the odd-numbered lines and the addresses from the data buffer 420 and the address buffer 430, that is, the reading of the odd-numbered line data of one transfer unit, is completed. Thus, the buffer reading control unit 440 notifies the buffer writing control unit 112 that there is an available area in which the preprocessed image data of the odd-numbered lines and the addresses can be stored in the storage areas of the data buffer 420 and the address buffer 430.

When reading of an amount of the preprocessed image data of the even-numbered lines and the addresses to be transferred to the DRAM 72 by one DMA, from the data buffer 420 and the address buffer 430, is completed, the buffer reading control unit 440 outputs a reading completion notification to the buffer writing control unit 122. This reading completion notification indicates that the reading of the preprocessed image data of the even-numbered lines and the addresses from the data buffer 420 and the address buffer 430, that is, the reading of the even-numbered line data of one transfer unit, is completed. Accordingly, the buffer reading control unit 440 notifies the buffer writing control unit 122 that there is an available area in which the preprocessed image data of the even-numbered lines and the addresses can be stored in the storage areas of the data buffer 420 and the address buffer 430.

The bus interface unit 450 exchanges (interfaces) the data of one transfer unit inputted from the buffer reading control unit 440 with the bus arbiter 70 based on protocol of DMA in the image processing device 1. More specifically, the bus interface unit 450 outputs a DMA request signal for access to the DRAM 72 to the bus arbiter 70 via the data bus 80. After the DMA request is accepted by the bus arbiter 70 and a DMA acceptance signal is inputted via the data bus 80, the bus interface unit 450 outputs the data of one transfer unit inputted from the buffer reading control unit 440 to the bus arbiter 70 via the data bus 80.

In the configuration of the data transfer control device 400 illustrated in FIG. 11, since the data buffer 420 and the address buffer 430 include the storage areas in which DMA can be performed four times, DMA can be continuously performed four times with the bus arbiter 70.

With such a configuration, in the data transfer control device 400, when the priority determination unit 410 stores the preprocessed image data of the respective lines in the data buffer 420, the priority determination unit 410 changes the order of the banks accessed when the preprocessed image data of the respective lines is transferred (written) to the DRAM 72. In the data transfer control device 400, the buffer reading control unit 440 reads the preprocessed image data of the respective lines in the order stored in the data buffer 420, bundles the read preprocessed image data of the respective lines, and then transfers the bundled preprocessed image data to the corresponding banks of the DRAM 72 by DMA.

Since an operation of changing the order of access to the banks of the DRAM 72 through a process of changing the banks in the data transfer control device 400 is the same as the operation of changing the order of access to the banks of the DRAM 72 through the process of changing the banks in the data transfer control device 100 of the first embodiment (e.g., see FIGS. 4, 9 and 10), a detailed description is omitted.

As described above, the data transfer control device 400 of the second embodiment changes the order of the banks accessed when the preprocessed image data of the respective lines is transferred (written) to the DRAM 72 by changing the order of storing either or both of the pieces of preprocessed image data when the data transfer control device 400 stores the preprocessed image data simultaneously input via the two lines in the data buffer 420. Accordingly, also in the data transfer control device 400, the order of the banks accessed when the preprocessed image data simultaneously input via the two lines is transmitted (written) to the DRAM 72 can be the same order at all lines, as in the data transfer control device 100 of the first embodiment. The data transfer control device 400 outputs one piece of preprocessed image data obtained by bundling the preprocessed image data of the respective lines whose order of access to the bank has been changed, to the bus arbiter 70 via the data bus 80 through transfer by DMA. Accordingly, also in the data transfer control device 400, the preprocessed image data of the respective lines can be transferred (written) to the DRAM 72 without increasing the number of processing blocks which transfer the preprocessed image data simultaneously input via the two lines to the DRAM 72, as in the data transfer control device 100 of the first embodiment. Accordingly, even when the image processing device 1 uses the data transfer control device 400 in place of the data transfer control device 100 of the first embodiment, and the image processing device 1 includes a processing block which simultaneously processes a plurality of data, it is possible to prevent continuous access to the same bank of the DRAM 72 through bank interleave, to suppress degradation of the efficiency of access to the DRAM 72 due to the loss time, and to increase the efficiency of access to the DRAM 72.

In the second embodiment, the configuration in which the storage area of the data buffer 420 which stores the preprocessed image data outputted through DMA transfer and the storage area of the address buffer 430 which stores the preprocessing image addresses outputted through the transfer of DMA are changed has been described. In other words, the configuration in which the priority determination unit 410 changes the order of the banks for access to the DRAM 72 when the preprocessed image data of the respective lines and the addresses are stored in the data buffer 420 and the address buffer 430 which provides the data transfer control device 400 has been described. However, the configuration in which the order of banks for access to the DRAM 72 is changed is not limited to the configuration shown in the second embodiment. For example, the storage areas of the data buffer 420 which reads the preprocessed image data outputted through DMA transfer and the storage areas of the address buffer 430 which reads the preprocessing image address outputted through DMA transfer may also be changed. In other words, a configuration in which the buffer reading control unit 440 changes the order of banks for access to the DRAM 72 when the preprocessed image data and the addresses stored in the data buffer 420 and the address buffer 430 are read and outputted by DMA in the data transfer control device 400 may be adopted. In this case, for example, the CPU 60 sets the order of reading the preprocessed image data stored in the data buffer 420 in the reading order register, which is not illustrated. Further, a configuration in which the buffer reading control unit 440 controls reading of the preprocessed image data stored in the data buffer 420 and the addresses stored in the address buffer 430 according to information of the order of reading the preprocessed image data set in the reading order register, which is not illustrated, may be considered.

The case in which the data transfer control device 400 is applied to the image processing device 1 in place of the data transfer control device 100 of the first embodiment has been described in the second embodiment. However, a data transfer control device having a different data input and output direction may be applied with the same configuration as that of the data transfer control device 400 in place of the data transfer control device 200 and the data transfer control device 300 illustrated in FIG. 1.

As described above, according to the embodiment of the present invention, the data transfer control device of this embodiment is applied to the processing block which processes a plurality of pieces of simultaneously input data in the image processing device including the component which simultaneously outputs the plurality of pieces of data. The data transfer control device sets the order of the banks of the DRAM accessed through one DMA transfer to be the same order between a plurality of pieces of simultaneously input data by changing the order of storing data in each of the data buffer and the address buffer which provides the data transfer control device itself. Accordingly, in the image processing device to which the data transfer control device of the embodiment of the present invention is applied, the order of the banks of the DRAM accessed when the processing block, which processes a plurality of pieces of simultaneously input data, transfers the processed data is the same in the respective data after the processing. In this case, the data transfer control device takes the same order as an order of the banks in which another processing block which provides the image processing device to which the data transfer control device of the embodiment of the present invention is applied accesses to the DRAM. Accordingly, the order of the banks, when the respective processing blocks which provide the image processing device to which the data transfer control device of the embodiment of the present invention is applied access the DRAM, can be the same in all the processing blocks in the image processing device. Accordingly, even when the other processing block which provides the image processing device which applies the data transfer control device of the embodiment of the present invention accesses the DRAM in parallel, continuous access to the same bank does not occur in the access to the DRAM through bank interleave. Thus, in the image processing device to which the data transfer control device of the embodiment of the present invention is applied, it is possible to suppress degradation of the efficiency of access to the DRAM due to the loss time caused by the continuous access to the same bank of the DRAM.

According to the embodiment of the present invention, when the data transfer control device of this embodiment transfers the respective processed data to the DRAM, the data transfer control device bundles the respective data whose order of access to the banks has been changed into one and transfers the resultant data. Accordingly, the image processing device which applies the data transfer control device of the embodiment of the present invention can transfer a plurality of pieces of processed data to the DRAM without increasing the number of processing blocks which process a plurality of pieces of simultaneously inputted data and transfer the resultant data to the DRAM. Accordingly, it is possible to reduce the number of times the respective processing blocks which provides the image processing device which applies the data transfer control device of the embodiment of the present invention access the DRAM in parallel. Accordingly, in the image processing device which applies the data transfer control device of the embodiment of the present invention is applied, it is possible to facilitate arbitration of requests for access to the DRAM from the respective processing blocks which provides the image processing device. In the image processing device which applies the data transfer control device of the embodiment of the present invention, even when the respective processing blocks which provides the image processing device access the DRAM in parallel, it is possible to prevent the continuous access to the same bank of the DRAM through bank interleave and increase efficiency of access to the DRAM.

In this embodiment, the configuration which is provided with the data transfer control device the image transfer unit 21 which transfers (writes) the preprocessed image data to the DRAM 72, in the configuration which is provided with the image sensor 10 in the image processing device 1 simultaneously outputs the input image data to the preprocessing unit 20 via the two lines, has been described. The operation in which the data transfer control device changes the order of the banks accessed when the preprocessed image data of the respective lines is transferred (written) to the DRAM 72, bundles the preprocessed image data of the respective lines, and then transfers (writes) the bundled image data to the DRAM 72 has been described. However, the processing block including the data transfer control device, that is, the processing block which speeds up processing for each piece of data by processing a plurality of data in parallel, is not limited to the configuration shown in this embodiment. For example, in the image processing device 1, the data transfer control device of this embodiment can be applied to the other processing blocks, including the image processing unit 30 and the display processing unit 40, since acceleration of processing is required in these processing blocks.

The data transfer control device of this embodiment can be applied to not only processing blocks which accelerate processing, but also processing blocks which simultaneously process a plurality of pieces of data. For example, in the image processing device 1, the data transfer control device of this embodiment can be applied to the image processing unit 30 as a configuration used to simultaneously acquire (read) a plurality of pieces of image data for recording stored in the DRAM 72 when the plurality of pieces of image data for recording are simultaneously acquired (read) and a process is performed on the plurality of pieces of acquired image data for recording.

Here, for example, a process of combining a bright image and a dark image having the same angle of view to generate an image having a wide dynamic range, a process of calculating a correlation between a plurality of pieces of image data for recording, or the like is considered as the process performed on the plurality of pieces of image data for recording by the image processing unit 30. For example, in the image processing device 1, the data transfer control device of this embodiment may be applied to the display processing unit 40 as a configuration for simultaneously acquiring (reading) image data for displaying and data for OSD display stored in the DRAM 72 when the image data for displaying and the data for OSD display are simultaneously acquired (read) and a displaying process is performed. For example, a case in which different formats of image data such as a YC format of image data or an RGB format of image data is stored in different storage areas in the DRAM 72, the different formats of image data are simultaneously acquired (read), and a process is performed on each format of acquired image data is considered in the image processing device 1. In this case, the data transfer control device of this embodiment can be applied to any processing block as a configuration for simultaneously acquiring (reading) the different formats of image data. For example, in the image processing device 1, the data transfer control device of this embodiment can be applied to any processing block as a configuration for simultaneously acquiring (reading) a plurality of pieces of image data having no correlation when the image data is stored in different storage areas of the DRAM 72.

Here, a case in which the data transfer control device of this embodiment is applied to another processing block and the image processing device 1 includes such a processing block will be described. FIGS. 12A to 12C are diagrams illustrating another example of the data transfer method in the image processing device 1 to which the data transfer control device of the first embodiment is applied. An example of a case in which the data transfer control device 200 which provides the image processing unit 30 simultaneously acquires (reads) image data in different areas within two pieces of image data for recording from the DRAM 72 and performs a combination process on the acquired image data in the two areas is illustrated in FIGS. 12A to 12C.

As illustrated in FIG. 12A, when an image P1 and an image P2 are stored as image data for recording in the DRAM 72, banks in which the image data of the respective images is stored, for example, are arranged in the order of bank A, bank B, bank C and bank D in a horizontal direction (lateral direction) with respect to the image in the first line. However, when motion of a subject is considered in a combination process, it may be necessary to combine image data in the different areas of the image P1 and the image P2. In other words, a combination of image data in an area R1 of the image P1 and image data in an area R2 of the image P2 illustrated in FIG. 12A may be necessary according to a motion amount of the subject within the two images.

In this case, relationships of the banks in the respective areas are different in the area R1 and in the area R2, as can be seen from FIG. 12A. More specifically, image data in the area R1 of the image P1 is arranged in the order of bank B, bank C, bank D and bank A in the horizontal direction (lateral direction) with respect to the image whereas image data in the area R2 of the image P2 is arranged in the order of bank D, bank A, bank B and bank C in the horizontal direction (lateral direction) with respect to the image. Each time the area R1 in the image P1 and the area R2 in the image P2 to be combined are changed, the relationships of the banks become different. Thus, if the image data of the two images is directly acquired (read) from the DRAM 72 in a state in which the relationships of the banks differ, the continuous access to the same bank of the DRAM 72 occurs, and efficiency of access to the DRAM 72 is degraded.

Therefore, the data transfer control device 200 which provides the image processing unit 30 performs the acquisition (reading) of the image data in which the continuous access to the same bank of the DRAM 72 is prevented, as illustrated in FIG. 12B. A case in which the order of the banks, when image data in the area R2 of the image P2 is acquired (read), is made the same as the order of the banks, when the image data in the area R1 of the image P1 is acquired (read), is illustrated in FIG. 12B. The data manipulation unit 130 in the data transfer control device 200 divides the acquired (read) image data into the image data of the area R1 and the image data of the area R2, and then the bank changing unit 110 and the bank changing unit 120 change the order of the banks and output the resultant image data to a combination processing unit, which is not illustrated, that combines the image data of the area R1 and the image data of the area R2.

More specifically, the bank changing unit 110 does not change the order of the banks of the divided image data of the area R1 (the order of bank B, bank C, bank D and bank A) and directly outputs the image data to the combination processing unit, which is not illustrated, in the order of bank B, bank C, bank D and bank A.

Then, the bank changing unit 120 changes the order of the banks of the divided image data of the area R2 (the order of bank B, bank C, bank D and bank A) and outputs the resultant image data to the combination processing unit, which is not illustrated, in the order of bank D, bank A, bank B and bank C. Accordingly, the combination process unit, which is not illustrated, can perform a process of combining the image data of the area R1 and the image data of the area R2 input in the correct order.

When bank access to the DRAM 72 in another processing block which provides the image processing device 1 is considered, efficiency of access to the DRAM is high if access is performed in the same order as the order in which the other processing block accesses the respective banks of the DRAM 72.

A case in which the order of the banks when the image data in the area R1 of the image P1 and the image data in the area R2 of the image P2 are acquired (read) is set to the order of bank A, bank B, bank C and bank D which is the order in which the other processing block which provides the image processing device 1 accesses the respective banks of the DRAM 72 is illustrated FIG. 12C. The data manipulation unit 130 in the data transfer control device 200 divides the acquired (read) image data into the image data of the area R1 and the image data of the area R2, and the bank changing unit 110 and the bank changing unit 120 change the order of the banks and output the resultant image data to the combination processing unit, which is not illustrated, that combines the image data of the area R1 and the image data of the area R2, as in the example illustrated in FIG. 12B.

More specifically, the bank changing unit 110 changes the order of the banks of the divided image data of the area R1 (the order of bank A, bank B, bank C and bank D), and outputs the resultant image data to the combination processing unit, which is not illustrated, in the order of bank B, bank C, bank D and bank A. Then, the bank changing unit 120 changes the order of the banks of the divided image data of the area R2 (the order of bank A, bank B, bank C and bank D), and outputs the resultant image data to the combination processing unit, which is not illustrated, in the order of bank D, bank A, bank B and bank C. Accordingly, the combination processing unit, which is not illustrated, can perform a process of combining the image data of the area R1 and the image data of the area R2 input in the correct order, as in the example illustrated in FIG. 12B.

In this embodiment, the case in which the image sensor 10 which provides the image processing device 1 simultaneously outputs the input image data to the preprocessing unit 20 via the two lines has been described. In other words, the case in which the data transfer control device of this embodiment is which provides the processing block which processes two pieces of data in parallel, and the data transfer control device changes banks accessed when the two pieces of respective data are transferred (written) to the DRAM, bundles the data, and then transfers (writes) the resultant data to the DRAM has been described. However, for example, the number of pieces of simultaneously input data supported by the data transfer control device of this embodiment is not limited to the configuration shown in this embodiment, and for example, the method of the data transfer control device of the present invention can also be applied when the data transfer control device is which provides a processing block to which much data is simultaneously input.

In this embodiment, the case in which, as the image sensor 10 which provides the image processing device 1 raster scan pixels and sequentially simultaneously outputs the input image data in the horizontal direction (lateral direction) with respect to the image via the two lines, the preprocessing unit 20 collects the preprocessed image data of the two lines in the horizontal direction (lateral direction) with respect to the image and transfers (writes) the resultant image data to the DRAM 72 has been described. The case in which the image processing unit 30 divides the image into blocks having a predetermined size and acquires (reads) preprocessed image data in the vertical direction (longitudinal direction) in each block from the DRAM 72 has been described. However, the processing block including the data transfer control device, that is, the processing block which transfers (writes) the respective data by processing a plurality of pieces of data in parallel, is not limited to the configuration shown in this embodiment. For example, when the processing block which processes a plurality of pieces of data in parallel collects the data after the processing and transfers (writes) the resultant data to the DRAM 72, and the processing block which acquires (reads) the data after the processing from the DRAM 72 have the same processing direction, the data transfer control device of this embodiment can also be applied to these processing blocks.

In this embodiment, the configuration in which the data buffer and the address buffer are dedicated buffers which provides the data transfer control device, in which the order of the banks for access to the DRAM 72 is changed, has been described. In other words, the configuration in which the data buffer 113, the address buffer 114, the data buffer 123 and the address buffer 124 are dedicated buffers which change the order of the banks for access to the DRAM 72 in the data transfer control device 200 has been described. Further, the configuration in which the data buffer 420 and the address buffer 430 are dedicated buffers which change the order of the banks for access to the DRAM 72 in the data transfer control device 400 has been described.

However, the configuration of the data buffer and the address buffer is not limited to the configuration shown in this embodiment. For example, in a general processing block which performs output of data through DMA transfer, when transfer of data is delayed due to congestion of the data bus, a buffer which temporally stores data provides in order to transfer data reliably when the data bus is available. For example, in the general processing block which performs output of data through DMA transfer, when an internal clock for processing data and a clock in the data bus are different, a buffer which temporally stores the data is considered to be provided used to perform transfer of such clocks. Therefore, when the method of the present invention is applied to a processing block already having the same configuration as the data buffer and the address buffer in the data transfer control device of this embodiment, the already included buffer may be used as the data buffer and the address buffer in the data transfer control device of this embodiment. In this case, it is possible to improve efficiency of access to the DRAM without increasing a circuit scale of the processing block. This is advantageous in comparison with a conventional configuration which mounts a buffer for changing the order of access to the banks of the DRAM within a bus arbiter in the bus arbiter.

In this embodiment, the configuration in which the packing unit 111 and the packing unit 121 which provides the data transfer control device 100 or the data transfer control device 400 pack the input image data, and generate the address of the DRAM 72 which transfers the packed image data has been described. However, the configuration of generating the address of the DRAM 72 is not limited to the configuration shown in this embodiment. For example, a configuration in which the buffer reading control unit 115, the buffer reading control unit 125, the priority determination unit 131 or the bus interface unit 132 in the data transfer control device 100 generates the address of the DRAM 72 may be adopted. In this case, a configuration in which the address buffer 114 and the address buffer 124 are not included in the data transfer control device 100 may be adopted.

In this embodiment, while the case in which the DRAM 72 which is a destination to which the data transfer control device 100 or the data transfer control device 400 transfers the image data includes four banks (bank A, bank B, bank C and bank D) has been described, the configuration of the banks in the DRAM is not limited to the configuration shown in this embodiment. For example, the same may be considered for a DRAM including eight banks.

In this embodiment, the case in which the access through bank interleave in which continuous access to the four banks of the DRAM 72 is performed twice in succession in one DMA in the data transfer control device 100 or the data transfer control device 400 is one transfer unit of DMA has been described. However, the number of banks accessed through one DMA is not limited to the configuration shown in this embodiment. For example, access to one bank through one DMA may be one transfer unit of DMA.

In this embodiment, the case in which the image processing device such as a camera for still images is the data processing device of the present invention, and the data transfer control device of the present invention is applied to this image processing device has been described. However, a system of the data processing device to which the data transfer control device of this embodiment can be applied is not limited to the embodiment of the present invention. The data transfer control device can be similarly applied to any system as long as the system has a data processing device in which a processing block connected to a data bus processes a plurality of pieces of simultaneously input data and sequentially accesses different banks of one DRAM through bank interleave.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A data processing device comprising:
a first processing block which is connected to a common bus and which processes a plurality of data, which is inputted simultaneously, in parallel;
at least one second processing block connected to the common bus;
a memory which is consisted of address space which has a plurality of banks; and
a common bus arbitration unit which arbitrates a request for access to the memory outputted from the processing block, and controls exchange of data via the common bus between the processing block whose access request has been accepted and the memory,
wherein the processing block includes a data transfer control device which changes an order of access to the bank of the memory corresponding to the respective data, unifies the respective data into an exchange data, and exchanges the exchange data with the memory when the processing block performs exchanging of the data to be processed in parallel with the memory via the common bus,
wherein the data is consisted of an area of a first direction and an area of a second direction,
wherein the first processing block processes a plurality of the data inputted simultaneously in the first direction of the data in parallel, unifies the respective processed data into the exchange data, accesses the bank of the memory in the first direction of the data, and exchanges the exchange data with the memory, and
wherein the second processing block accesses the bank of the memory in the second direction of the data, and exchanges at least one of the data which is included in the exchange data with the memory.

2. The data processing device according to claim 1, wherein
the data transfer control device comprising:
a bank changing unit which performs a change the respective data to be processed in parallel so that the order of access to the bank of the memory corresponding to the data becomes a predetermined order; and
a data manipulation unit which unifies the respective data into the exchange data so that the exchange the data to be processed in parallel with the memory is performed continuously in a predetermined order.

3. The data processing device according to claim 2, wherein
the bank changing unit comprising:
a buffer unit which stores the respective data to be exchanged with the memory;
a buffer writing control unit which stores the respective data in the buffer unit; and
a buffer reading control unit which reads the respective data stored in the buffer unit.

4. The data processing device according to claim 3, wherein
the bank changing unit includes the buffer unit, the buffer writing control unit, and the buffer reading control unit for each of the data to be processed in parallel.

5. The data processing device according to claim 3, wherein
the buffer writing control unit stores the data in a storage area corresponding to the bank of the buffer unit based on a predetermined order of the data.

6. The data processing device according to claim 3, wherein
the buffer reading control unit reads the data from a storage area corresponding to the bank of the buffer unit based on a predetermined order of the data.

7. The data processing device according to claim 1, wherein
the data is an image data,
the first direction is a horizontal direction of the image data, and
the second direction is a vertical direction of the image data.

8. The data processing device according to claim 7, wherein
data of two lines in the horizontal direction which are continuous in the vertical direction of the image data are inputted simultaneously to the first processing block, and
the first processing block processes the data of two lines which are inputted in parallel.

9. The data processing device according to claim 7, wherein
a plurality of the image data are inputted simultaneously to the first processing block, and
the first processing block processes the plurality of the image data which are inputted in parallel.

10. The data processing device according to claim 9, wherein
data in the predetermined range in the horizontal direction and the vertical direction within the plurality of pieces of image data are inputted simultaneously to the first processing block, and
the first processing block processes each of the data in the predetermined range in parallel.

11. A data transfer control device in a data processing device which comprises:
a first processing block which is connected to a common bus and which processes a plurality of data, which is inputted simultaneously, in parallel;
at least one second processing block connected to the common bus;
a memory which is consisted of address space which has a plurality of banks; and
a common bus arbitration unit which arbitrates a request for access to the memory outputted from the processing block, and controls exchange of data via the common bus between the processing block whose access request has been accepted and the memory,
wherein the data transfer control device provides the processing block and changes an order of access to the bank of the memory corresponding to the respective data, unifies the respective data into an exchange data, and exchanges the exchange data with the memory when the processing block performs exchanging of the data to be processed in parallel with the memory via the common bus,
wherein the data is consisted of an area of a first direction and an area of a second direction,
wherein the first processing block processes a plurality of the data inputted simultaneously in the first direction of the data in parallel, unifies the respective processed data into the exchange data, accesses the bank of the memory in the first direction of the data, and exchanges the exchange data with the memory, and
wherein the second processing block accesses the bank of the memory in the second direction of the data, and exchanges at least one of the data which is included in the exchange data with the memory.

* * * * *